US012695976B2

(12) United States Patent
Yi

(10) Patent No.: US 12,695,976 B2
(45) Date of Patent: Jul. 28, 2026

(54) VIDEO PROCESSING METHOD, ELECTRONIC DEVICE, AND READABLE MEDIUM

(71) Applicant: HONOR DEVICE CO., LTD., Shenzhen (CN)

(72) Inventor: Jie Yi, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 0 days.

(21) Appl. No.: 18/259,414

(22) PCT Filed: Dec. 14, 2022

(86) PCT No.: PCT/CN2022/138960
§ 371 (c)(1),
(2) Date: Jun. 27, 2023

(87) PCT Pub. No.: WO2023/160142
PCT Pub. Date: Aug. 31, 2023

(65) Prior Publication Data
US 2025/0088730 A1      Mar. 13, 2025

(30) Foreign Application Priority Data

Feb. 28, 2022      (CN) .......................... 202210187220.4

(51) Int. Cl.
*H04N 23/63*      (2023.01)
*H04N 23/667*      (2023.01)

(52) U.S. Cl.
CPC ......... *H04N 23/632* (2023.01); *H04N 23/633* (2023.01); *H04N 23/667* (2023.01)

(58) Field of Classification Search
CPC .................................................... H04N 23/632
See application file for complete search history.

(56) References Cited

U.S. PATENT DOCUMENTS 8,745,500 B1 *   6/2014   Kostello .............. G11B 27/031
                                                                386/282
12,395,689 B2 *   8/2025   Han ................. H04N 21/47205
                        (Continued)

FOREIGN PATENT DOCUMENTS

CN          107124568 A      9/2017
CN          110401766 A      11/2019
                        (Continued)

OTHER PUBLICATIONS

EP Summons to Attend Oral Proceedings Pursuant to Rule 115(1) EPC in European Appln. No. 22905479.6, mailed on Oct. 6, 2025, 7 pages.

*Primary Examiner* — Cynthia Calderon
(74) *Attorney, Agent, or Firm* — Fish & Richardson P.C.

(57)      ABSTRACT

Embodiments of this application provide a video processing method, an electronic device, a program product, and a computer-readable storage medium. The video processing method includes: shooting a first video in response to a first operation; and displaying a first interface in response to a second operation. The first interface includes a first region, a second region, and a first control, includes the first region and the second region, or includes the first region and the first control. The first region is a playback region of the first video. The second region displays a cover thumbnail of the first video, a thumbnail of a first image, and a thumbnail of a second image, the first image is an image of the first video at a first moment, the second image is an image of the first video at a second moment.

20 Claims, 39 Drawing Sheets

(56)     References Cited

U.S. PATENT DOCUMENTS

| | | | |
|---|---|---|---|
| 2007/0222884 A1 | 9/2007 | Mori et al. | |
| 2009/0309989 A1 | 12/2009 | Tanaka et al. | |
| 2010/0107080 A1* | 4/2010 | Bentley | G11B 27/031 |
| | | | 715/723 |
| 2011/0161348 A1* | 6/2011 | Oron | G11B 27/034 |
| | | | 707/769 |
| 2013/0222629 A1 | 8/2013 | Burian et al. | |
| 2015/0156552 A1* | 6/2015 | Wayans | H04N 5/772 |
| | | | 386/230 |
| 2017/0109585 A1 | 4/2017 | Matias et al. | |
| 2017/0289617 A1 | 10/2017 | Song et al. | |
| 2021/0160435 A1* | 5/2021 | Pena | G06F 3/04883 |
| 2021/0382941 A1* | 12/2021 | Wu | G06F 16/732 |
| 2024/0155222 A1 | 5/2024 | Jiang | |

FOREIGN PATENT DOCUMENTS

| | | |
|---|---|---|
| CN | 110557566 A | 12/2019 |
| CN | 111061912 A | 4/2020 |
| CN | 111835957 A | 10/2020 |
| CN | 111866404 A | 10/2020 |
| CN | 114827342 A | 7/2022 |
| CN | 115002340 A | 9/2022 |
| EP | 4199492 A1 | 6/2023 |
| KR | 101475669 B1 | 12/2014 |

* cited by examiner

301

302

501

602

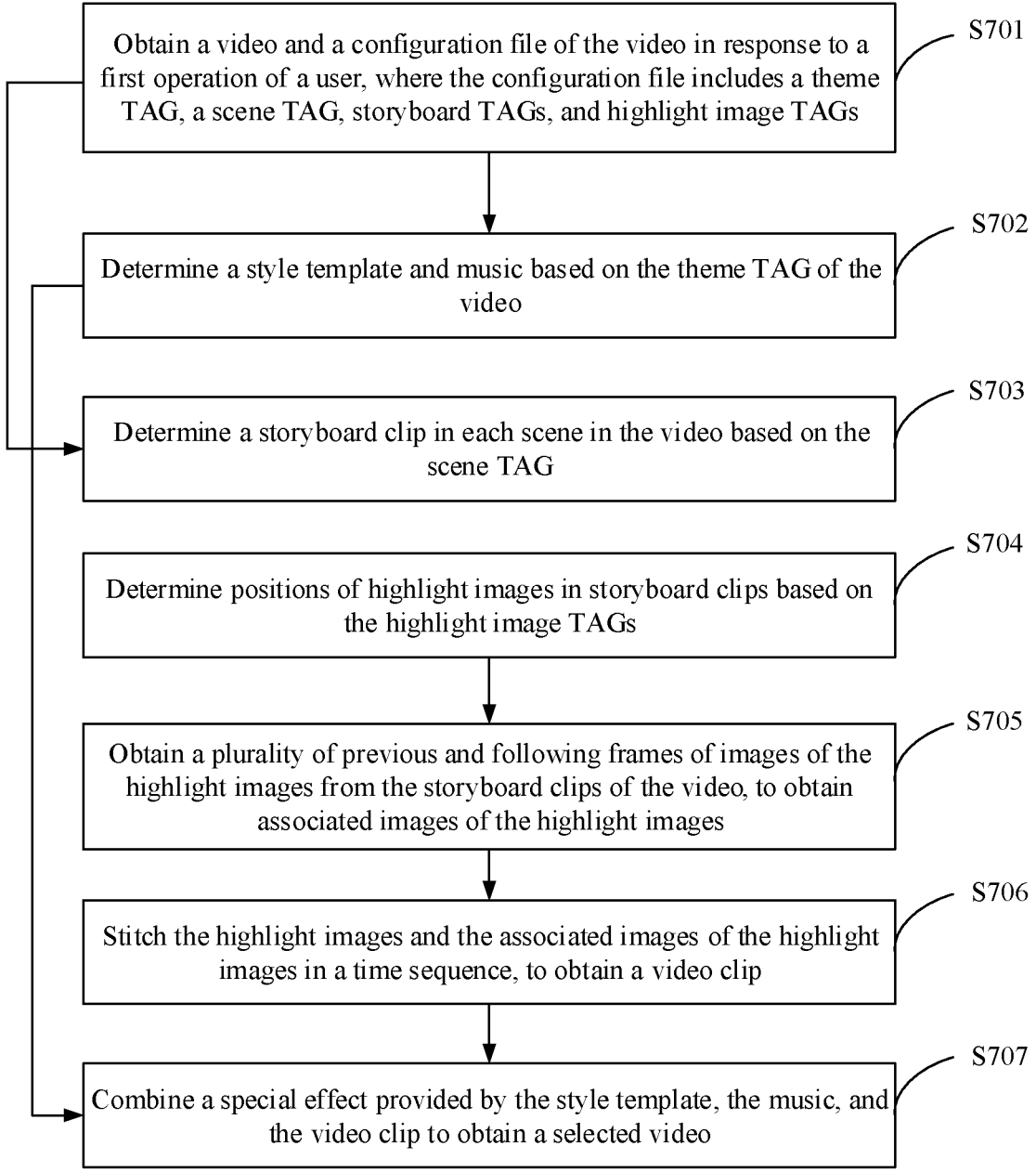

Obtain a video and a configuration file of the video in response to a first operation of a user, where the configuration file includes a theme TAG, a scene TAG, storyboard TAGs, and highlight image TAGs    S701

Determine a style template and music based on the theme TAG of the video    S702

Determine a storyboard clip in each scene in the video based on the scene TAG    S703

Determine positions of highlight images in storyboard clips based on the highlight image TAGs    S704

Obtain a plurality of previous and following frames of images of the highlight images from the storyboard clips of the video, to obtain associated images of the highlight images    S705

Stitch the highlight images and the associated images of the highlight images in a time sequence, to obtain a video clip    S706

Combine a special effect provided by the style template, the music, and the video clip to obtain a selected video    S707

VIDEO PROCESSING METHOD, ELECTRONIC DEVICE, AND READABLE MEDIUM

CROSS-REFERENCE TO RELATED APPLICATIONS

This application is a national stage of International Application No. PCT/CN2022/138960 filed on Dec. 14, 2022, which claims priority to Chinese Patent Application No. 202210187220.4, filed on Feb. 28, 2022. The disclosures of the aforementioned applications are hereby incorporated by reference in their entireties.

TECHNICAL FIELD

This application relates to the field of electronic device technologies, and in particular, to a video processing method, an electronic device, a program product, and a computer-readable storage medium.

BACKGROUND

Currently, photographing and video recording functions have become essential functions of an electronic device. A demand and experience of a user for recording and photographing are also increasing. In some video shooting application scenarios, a user expects to capture a memorable magic moment photo while shooting a video.

Therefore, a method for obtaining a memorable magic moment photo while shooting a video needs to be provided.

SUMMARY

This application provides a video processing method, an electronic device, a program product, and a computer-readable storage medium, so that a user can obtain a magic moment photo while shooting a video.

To achieve the foregoing objective, this application provides the following technical solutions:

According to a first aspect, this application provides a video processing method applied to an electronic device. The video processing method includes: shooting a first video in response to a first operation; and displaying a first interface in response to a second operation. The first interface is a detail interface of the first video, and the first interface includes a first region, a second region, and a first control, the first interface includes the first region and the second region, or the first interface includes the first region and the first control. The first region is a play back region of the first video. The second region displays a cover thumbnail of the first video, a thumbnail of a first image, and a thumbnail of a second image, the first image is an image of the first video at a first moment, the second image is an image of the first video at a second moment, and a recording process of the first video includes the first moment and the second moment. The first control is used to control the electronic device to generate a second video, duration of the second video is less than duration of the first video, and the second video includes at least images of the first video.

It may be learned from the foregoing content that a user shoots a video by using the electronic device, and the electronic device can obtain the shot first video, the first image, and the second image, so that the user can obtain a magic moment photo while shooting a video.

In a possible implementation, the video processing method further includes: displaying a second interface in response to a third operation, where the third operation is a touch operation on the first control, and the second interface is a display interface of the second video.

In this possible implementation, after the user shoots the video, the electronic device obtains the first video, the first image, and the second image, and may further obtain and display the second video. The duration of the second video is less than the duration of the first video, and the second video includes the images of the first video. Therefore, the user can obtain a magic moment photo while shooting a video, and further obtain a small video of the first video to facilitate sharing by the user.

In a possible implementation, the displaying a first interface in response to a second operation includes: displaying a third interface in response to a fourth operation, where the third interface is an interface of a gallery application, and the third interface includes the cover thumbnail of the first video; and displaying the first interface in response to a touch operation on the cover thumbnail of the first video.

In a possible implementation, the displaying a first interface in response to a second operation includes: displaying the first interface in response to a touch operation on a second control, where a shooting interface of the electronic device includes the second control, and the second control is used to control display of a previously shot image or video.

In a possible implementation, the cover thumbnail of the first video includes a first identifier, and the first identifier is used to indicate that the first video is shot by the electronic device in a Magic Take mode.

In a possible implementation, the first interface displays a mask, and the second region is not covered by the mask.

In a possible implementation, the first interface further includes a first dialog box, the first dialog box is used to prompt the user that the first image and the second image have been generated, and the first dialog box is not covered by the mask.

In a possible implementation, after the shooting a first video in response to a first operation, the video processing method further includes: displaying a shooting interface of the electronic device in response to a fifth operation, where the shooting interface includes a second dialog box, and the second dialog box is used to prompt the user that the first video and the second video have been generated.

In a possible implementation, before the shooting a first video in response to a first operation, the video processing method further includes: displaying a fourth interface in response to a sixth operation, where the fourth interface is a shooting setting interface, the fourth interface includes a Magic Take option and a text segment, the Magic Take option is used to control the electronic device to enable or disable a Magic Take function, and the text segment is used to indicate content of the Magic Take function.

In a possible implementation, after the shooting a first video in response to a first operation, the video processing method further includes: displaying a fifth interface in response to a seventh operation, where the fifth interface is an interface of the gallery application, the fifth interface includes a first folder and a second folder, the first folder includes images and videos that are saved by the electronic device, and the second folder includes the first image and the second image; and displaying a sixth interface in response to an eighth operation, where the sixth interface includes the thumbnail of the first image and the thumbnail of the second image, and the eighth operation is a touch operation on the second folder.

In a possible implementation, after the displaying a second interface in response to a third operation, the video processing method further includes: displaying a seventh interface in response to a ninth operation, where the seventh interface is a detail interface of the second video, the ninth operation is a touch operation on a third control included in the second interface, and the third control is used to control saving of the second video.

In a possible implementation, the video processing method further includes: displaying an eighth interface in response to a tenth operation, where the eighth interface is an interface of the gallery application, and the eighth interface includes a cover thumbnail of the second video and the cover thumbnail of the first video.

In a possible implementation, after the shooting a first video in response to a first operation, the video processing method further includes: displaying a first shooting interface of the electronic device in response to an eleventh operation, where the first shooting interface includes a first option and a second option, the first option is used to indicate a photo mode, and the second option is used to indicate a video mode: displaying the first shooting interface of the electronic device in response to an operation on a fourth control in the shooting interface, where the fourth control is used to enable photographing; and displaying a second shooting interface of the electronic device in response to an operation on the second option, where the second shooting interface includes a third dialog box, and the third dialog box is used to indicate the content of the Magic Take function to the user.

In this possible implementation, after the user shoots the video, if the user further controls, by touching the fourth control, the electronic device to shoot a photo, when entering the shooting interface of the electronic device again to shoot a video, the electronic device can display the third dialog box in the shooting interface, to remind the user that the Magic Take function is configured in the electronic device.

In a possible implementation, in a process of shooting the first video in response to the first operation, the video processing method further includes: shooting and saving a third image in response to a twelfth operation, where the twelfth operation is a touch operation on a photo key of a video shooting interface of the electronic device.

In this possible implementation, when the electronic device shoots the video, the electronic device further shoots and saves the third image in response to the twelfth operation, so that the electronic device can use an image capture function when the electronic device shoots a video.

In a possible implementation, the second region further displays a thumbnail of the third image, and the second video includes the third image.

In this possible implementation, an image manually captured by the electronic device can be used to obtain the second video, so that the image captured by the user can be used as an image in the second video.

In a possible implementation, that the second region displays a cover thumbnail of the first video, a thumbnail of a first image, and a thumbnail of a second image includes: the second region displays the cover thumbnail of the first video, the thumbnail of the first image, and the thumbnail of the third image; and the second video includes at least the first image and the third image.

In a possible implementation, a generation manner of the second video includes: obtaining the first video and tag data of the first video, where the tag data includes a theme TAG of the first video, a story board TAG, a TAG of the first image, and a TAG of the second image; determining a style template and music based on the theme TAG of the first video, where the style template includes at least one special effect: obtaining a plurality of previous and following frames of images of the first image and a plurality of previous and following frames of images of the second image from the first video based on the story board TAG, the TAG of the first image, and the TAG of the second image; and combining the special effect of the style template, the music, and target images to obtain the second video, where the target images include at least the first image and the plurality of previous and following frames of images of the first image.

According to a second aspect, this application provides a video processing method applied to an electronic device. The video processing method includes: in response to a first operation, displaying a first interface, and starting shooting a first video, where the first interface is a preview interface displayed when the first video is shot, the first interface includes a first control, and the first control is used to shoot an image: in response to a second operation, shooting and saving a first image in a process of shooting the first video, where the second operation is a touch operation on the first control; and after completing shooting of the first video, displaying a second interface in response to a third operation. The second interface is a detail interface of the first video, and the second interface includes a first region, a second region, and the first control, the second interface includes the first region and the second region, or the second interface includes the first region and the first control. The first region is a playback region of the first video, the second region displays a cover thumbnail of the first video and a thumbnail of the first image, the first control is used to control the electronic device to generate a second video, duration of the second video is less than duration of the first video, and the second video includes at least images of the first video.

It may be learned from the foregoing content that when shooting a video by using the electronic device, the user can shoot and save the first image in response to the second operation, to implement capture while shooting a video. The electronic device can obtain the shot first video, the first image, and the second image, so that the user can capture an image when shooting a video.

In a possible implementation, the second region further displays thumbnails of one or more other frames of images, the one or more other frames of images are images in the first video, a quantity sum of the first image and the one or more other frames of images is greater than or equal to a preset quantity, and the preset quantity is a quantity of second images automatically identified by the electronic device in the process of shooting the first video.

In a possible implementation, the second video includes at least one or more frames of the following images: the first image and the one or more other frames of images.

In a possible implementation, the video processing method further includes: displaying a third interface in response to a fourth operation, where the fourth operation is a touch operation on the first control, and the third interface is a display interface of the second video.

In a possible implementation, after shooting of the first video is completed, the video processing method further includes: displaying a first shooting interface of the electronic device, where the shooting interface includes a first option and a second option, the first option is used to indicate a photo mode, the second option is used to indicate a video mode, and the first shooting interface is a preview interface displayed when an image is shot: displaying the first shooting interface of the electronic device in response to an operation on a second control in the shooting interface, where the second control is used to enable photographing; and displaying a second shooting interface of the electronic device in response to an operation on the second option, where the second shooting interface includes a first dialog box, the first dialog box is used to indicate content of a Magic Take function to the user, and the second shooting interface is a preview interface displayed when a video is shot.

In a possible implementation, after shooting of the first video is completed, the video processing method further includes: displaying a third interface in response to a sixth operation, where the third interface is an interface of a gallery application, the third interface includes a first folder and a second folder, the first folder includes at least the first image, and the second folder includes the second image and a third image, or the second folder includes the second image; and displaying a fourth interface in response to a seventh operation, where the fourth interface includes a thumbnail of the second image and a thumbnail of the third image, or includes the thumbnail of the second image, and the seventh operation is a touch operation on the second folder.

According to a third aspect, this application provides an electronic device, including one or more processors, a memory, a camera, and a display screen. The memory, the camera, and the display screen are coupled to the one or more processors, the memory is configured to store computer program code, the computer program code includes computer instructions, and when the one or more processors execute the computer instructions, the electronic device performs the video processing method according to any one of the first aspect or the possible implementations of the first aspect, or the video processing method according to any one of the second aspect or the possible implementations of the second aspect.

According to a fourth aspect, this application provides a computer-readable storage medium, configured to store a computer program. When the computer program is executed by an electronic device, the electronic device is enabled to implement the video processing method according to any one of the first aspect or the possible implementations of the first aspect, or the video processing method according to any one of the second aspect or the possible implementations of the second aspect.

According to a fifth aspect, this application provides a computer program product. When the computer program product runs on a computer, the computer is enabled to perform the video processing method according to any one of the first aspect or the possible implementations of the first aspect, or the video processing method according to any one of the second aspect or the possible implementations of the second aspect.

BRIEF DESCRIPTION OF DRAWINGS

FIG. 8 is a flowchart of generating a selected video according to Embodiment 1 of this application:

DESCRIPTION OF EMBODIMENTS

Figure 1:
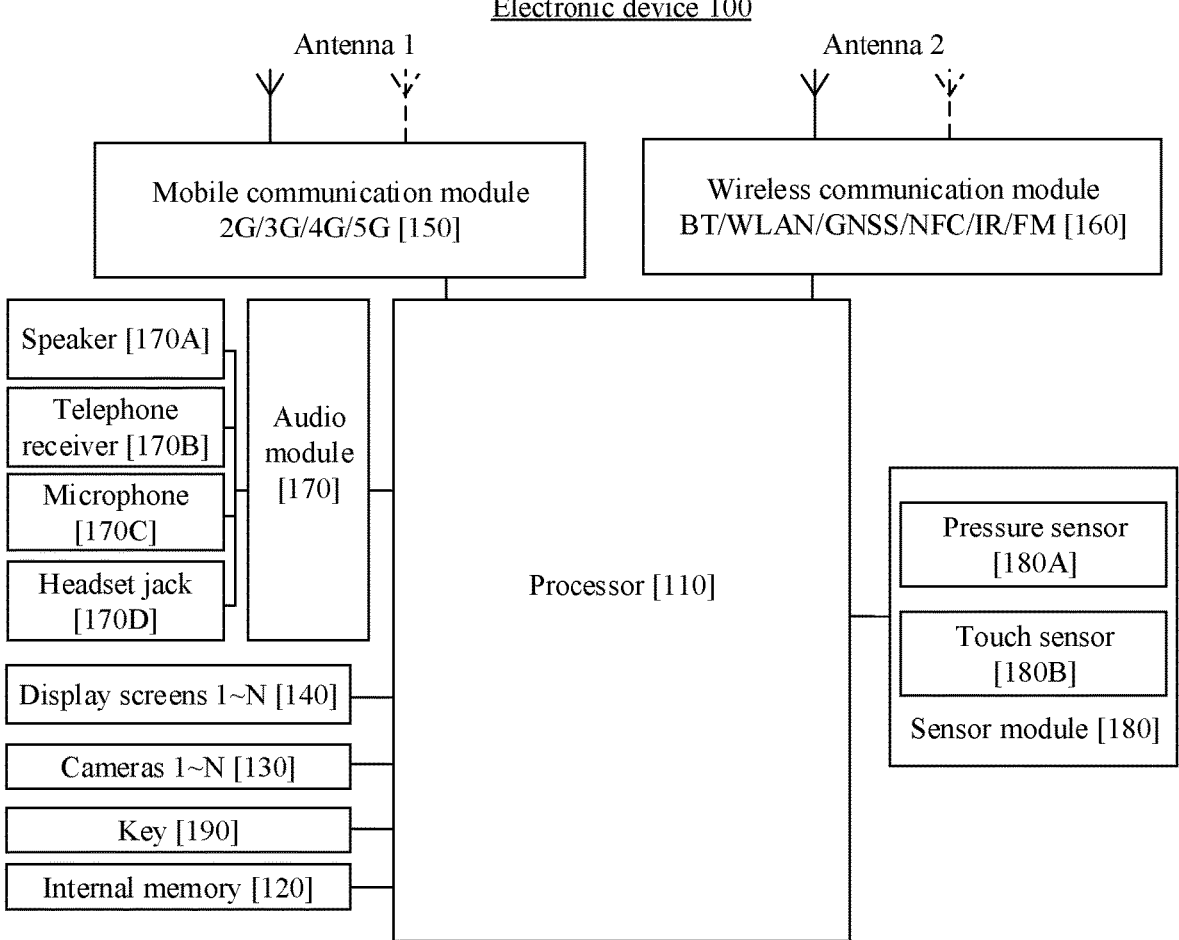
FIG. 1 is a diagram of a hardware structure of an electronic device according to this application.

The following clearly and completely describes technical solutions in embodiments of this application with reference to the accompanying drawings in the embodiments of this application. The terms used in the following embodiments are merely used for describing specific embodiments, and are not intended to limit this application. As used in this specification and the appended claims of this application, singular expressions "one", "a", "the", "the foregoing", and "this" are also intended to include an expression such as "one or more", unless otherwise clearly specified in the context. It should be further understood that in the embodiments of this application, "one or more" means one, two, or more than two, and "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between associated objects.

As described in this specification, referring to "an embodiment", "some embodiments", or the like means that one or more embodiments of this application include particular features, structures, or characteristics described with reference to the embodiments. Therefore, statements such as "in an embodiment", "in some embodiments", or "in some other embodiments" that appear in different parts of this application do not necessarily refer to same embodiments, but mean "one or more but not all embodiments" unless otherwise specifically emphasized. The terms "include", "comprise", and "have" and variants thereof all mean "include but are not limited to", unless otherwise specifically emphasized in another manner.

In the embodiments of this application, "a plurality of" means "greater than or equal to two". It should be noted that in description of the embodiments of this application, words such as "first" and "second" are merely used for distinguishing between descriptions, and cannot be understood as an indication or implication of relative importance, or cannot be understood as an indication or implication of a sequence.

Before the embodiments of this application are described, some terms or concepts in the embodiments of this application are first explained. It should be understood that, names of the following terms are not specifically limited in this application. The following terms may have other names. Renamed terms still meet the following related term explanations.

(1) Magic Take: Magic Take may be understood as a function in which when shooting a video by using a camera application, the user can obtain a shot original video, one or more highlight photos, and one or more selected videos by pressing a "shoot" icon once. It may be understood that, duration of a short highlight video obtained by using Magic Take is less than duration of a complete video. For example, a complete recorded video is one minute, and five magic moment photos and a short highlight video with duration of 15 seconds may be obtained. It may be further understood that, "Magic Take" may also have other names, such as "magic obtain", "magic shoot", "instant film", "instant movie", and "AI instant movie".

(2) Highlight image: Highlight images are some magic moment pictures in a video recording process. For example, the highlight image may be a best motion moment picture, a best expression moment picture, or a best check-in action picture. It may be understood that the term "highlight image" is not limited in this application. The highlight image may also be referred to as a good moment image, a splendid moment image, a magic moment image, a decisive moment image, a best shot (best shot, BS) image, an AI image, or the like. In different scenarios, the highlight image may be different types of moment pictures. For example, when a video of a football match is shot, the highlight image may be an image that is of a moment at which a foot of an athlete is in contact with a football or an image that is of a moment at which the football is kicked away by the athlete and that is obtained at the time of shooting or passing the football, or the highlight image may be an image of a moment at which the football flies into a goal or an image of a moment at which a goalkeeper catches the football. When a video in which a character jumps from the ground is shot, the highlight image may be an image of a moment at which the character is at a highest point in the air or an image of a moment at which the character performs a most-stretched movement in the air. When a scenery is shot, the highlight image may be an image in which a building appears in the scenery, or may be an image of the setting sun or the rising sun.

(3) Selected video: The selected video is a video including a highlight image. It may be understood that the term "selected video" is not limited in this application, either. The selected video may also be referred to as a highlight video, a short highlight video, a small highlight video, an AI video, or the like.

(4) Tag (TAG): TAGs may be divided into a theme TAG, a scene TAG, a highlight image TAG, a story board TAG, and the like. The theme TAG is used to indicate a style or an atmosphere of a video. The scene TAG is used to indicate a scene of a video. The highlight image TAG is used to indicate a position of a highlight image in a shot video. The story board TAG is used to indicate a scene transition position in a shot video. For example, a video includes one or more highlight image TAGs, and the highlight image TAGs may indicate that image frames at moments such as the tenth second of the video and the twentieth second after the first minute of the video are highlight images. The video also includes one or more storyboard TAGs, and the storyboard TAGs may indicate that a first scene is switched to a second scene at the fifteenth second of the video and the second scene is switched to a third scene at the forty-third second after the third minute of the video.

Currently, photographing and video recording functions have become essential functions of an electronic device. A demand and experience of a user for recording and photographing are also increasing. In some video shooting application scenarios, a user expects to capture a memorable magic moment photo while shooting a video. Based on this, in this application, a "Magic Take" mode is set in an electronic device, that is, when shooting a video in a video mode, the electronic device automatically extracts a highlight image in a video stream by analyzing the video stream. In addition, when completing shooting of the video, the electronic device may further generate one or more selected videos based on the highlight image. In addition, a user can view the shot video, the highlight image, and the selected video in a gallery.

To support a "Magic Take" mode of an electronic device, the embodiments of this application provide a video processing method. In addition, the video processing method provided in the embodiments of this application is applicable to a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, a smartwatch, and the like.

The mobile phone is used as an example. FIG. 1 shows an example of composition of an electronic device according to an embodiment of this application. As shown in FIG. 1, an electronic device 100 may include a processor 110, an internal memory 120, a camera 130, a display screen 140, an antenna 1, an antenna 2, a mobile communication module 150, a wireless communication module 160, an audio module 170, a sensor module 180, a key 190, and the like.

It may be understood that the structure shown in this embodiment does not constitute a specific limitation on the electronic device 100. In some other embodiments, the electronic device 100 may include more or fewer components than those shown in the figure, may combine some components, may split some components, or may have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a smart sensor hub (sensor hub), a neural-network processing unit (neural-network processing unit, NPU), and/ or the like. Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or data again, the processor 110 may directly invoke the instructions or data from the memory. This avoids repeated access and reduces waiting time of the processor 110, thereby improving system efficiency.

The internal memory 120 may be configured to store computer-executable program code. The executable program code includes instructions. The processor 110 performs various function applications and data processing of the electronic device 100 by running the instructions stored in the internal memory 120. The internal memory 120 may include a program storage area and a data storage area. The program storage area may store an operating system, an application required by at least one function (for example, a sound playing function or an image playing function), and the like. The data storage area may store data (such as audio data and a phone book) and the like created in a use process of the electronic device 100. In addition, the internal memory 120 may include a high-speed random access memory, and may further include a nonvolatile memory, for example, at least one disk storage device, flash memory device, or universal flash storage (universal flash storage, UFS). The processor 110 performs various function applications and data processing of the electronic device 100 by running the instructions stored in the internal memory 120 and/or the instructions stored in the memory disposed in the processor.

In some embodiments, the internal memory 120 stores instructions for performing the video processing method. The processor 110 may control, by executing the instructions stored in the internal memory 120, the electronic device to shoot a video in a "Magic Take" mode, to obtain a shot video, one or more highlight photos, and one or more selected videos.

The electronic device implements a display function by using the GPU, the display screen 140, the application processor, and the like. The GPU is a microprocessor for image processing, and is connected to the display screen 140 and the application processor. The GPU is configured to perform mathematical and geometrical calculation, and is configured to render a graphic. The processor 110 may include one or more GPUs. The one or more GPUs execute program instructions to generate or change display information.

The display screen 140 is configured to display an image, a video, or the like. The display screen 140 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oled, a quantum dot light emitting diode (quantum dot light emitting diodes, QLED), or the like. In some embodiments, the electronic device may include one or N display screens 140, where N is a positive integer greater than 1.

In some embodiments, the electronic device shoots a video in the "Magic Take" mode to obtain the shot video, one or more highlight photos, and one or more selected videos, and the display screen 140 displays the shot video, the one or more highlight photos, and the one or more selected videos to a user.

The electronic device 100 may implement a shooting function by using the ISP, the camera 130, the video codec, the GPU, the display screen 140, the application processor, and the like.

The ISP is configured to process data fed back by the camera 130. For example, at the time of photographing, a shutter is opened, and light is transmitted to a photosensitive element of the camera by using a lens. An optical signal is converted into an electrical signal. The photosensitive element of the camera transmits the electrical signal to the ISP for processing, to convert the electrical signal into an image visible to naked eyes. The ISP may further perform algorithm optimization on noise, brightness, and complexion of the image. The ISP may further optimize parameters such as exposure and a color temperature of a shooting scene. In some embodiments, the ISP may be disposed in the camera 130.

The camera 130 is configured to capture a still image or a video. An optical image is generated for an object by using the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal and then transmits the electrical signal to the ISP, and the ISP converts the electrical signal into a digital image signal. The ISP outputs the digital image signal to the DSP for processing. The DSP converts the digital image signal into an image signal in a standard form, for example, RGB or YUV. In some embodiments, the electronic device 100 may include one or N cameras 130, where N is a positive integer greater than 1.

In some embodiments, the camera 130 is configured to shoot the video described in the embodiments of this application.

The digital signal processor is configured to process a digital signal, and can process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. In this way, the electronic device 100 may play or record videos in a plurality of coding formats, for example, moving picture experts group (moving picture experts group, MPEG) 4, MPEG 2, MPEG 3, and MPEG 4.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution for wireless communication including 2G/3G/4G/5G and the like applied to the electronic device 100. The mobile communication module 150 may include at least one filter, switch, power amplifier, low noise amplifier (low noise amplifier, LNA), and the like. The mobile communication module 150) may receive an electromagnetic wave by using the antenna 1, perform processing such as filtering and amplification on the received electromagnetic wave, and send a processed electromagnetic wave to the modem processor for demodulation. The mobile communication module 150 may further amplify a signal obtained after modulation by the modem processor, and convert, by using the antenna 1, an amplified signal into an electromagnetic wave for radiation. In some embodiments, at least some functional modules in the mobile communication module 150 may be disposed in the processor 110. In some embodiments, at least some functional modules in the mobile communication module 150 may be disposed in a same device as at least some modules in the processor 110.

The wireless communication module 160) may provide a solution for wireless communication including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like applied to the electronic device 100. The wireless communication module 160 may be one or more components integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert, by using the antenna 2, the signal into an electromagnetic wave for radiation.

The electronic device may implement an audio function by using the audio module 170, a speaker 170A, a telephone receiver 170B, a microphone 170C, a headset jack 170D, the application processor, and the like. The audio function includes, for example, music playing and sound recording.

The audio module 170) is configured to convert digital audio information into an analog audio signal for output, and is also configured to convert analog audio input into a digital audio signal. The audio module 170 may be further configured to encode and decode audio signals. In some embodiments, the audio module 170 may be disposed in the processor 110, or some functional modules of the audio module 170 may be disposed in the processor 110.

The speaker 170A, also referred to as a "loudspeaker", is configured to convert an audio electrical signal into a sound signal. The electronic device may be configured to listen to music or answer a call in a hands-free mode by using the speaker 170A.

The telephone receiver 170B, also referred to as an "earpiece", is configured to convert an audio electrical signal into a sound signal. When the electronic device answers a call or receives a voice message, the telephone receiver 170B may be placed close to a human ear to receive a voice.

The microphone 170C, also referred to as a "mic" or "mike", is configured to convert a sound signal into an electrical signal. When making a call or sending a voice message, the user may make a sound by approaching the mouth to the microphone 170C, to input a sound signal to the microphone 170C. At least one microphone 170C may be disposed in the electronic device. In some other embodiments, two microphones 170C may be disposed in the electronic device, to implement a noise reduction function in addition to sound signal collection. In some other embodiments, three, four, or more microphones 170C may be alternatively disposed in the electronic device, to implement sound signal collection and noise reduction, and further identify a sound source and implement a directional recording function and the like.

The headset jack 170D is configured to be connected to a wired headset. The headset jack 170D may be a USB interface, or may be a 3.5 mm open mobile terminal platform (open mobile terminal platform, OMTP) standard interface or a cellular telecommunications industry association of the USA (cellular telecommunications industry association of the USA, CTIA) standard interface.

In the sensor module 180, a pressure sensor 180A is configured to sense a pressure signal, and can convert the pressure signal into an electrical signal. In some embodiments, the pressure sensor 180A may be disposed in the display screen 140. There are many types of pressure sensors 180A, such as a resistive pressure sensor, an inductive pressure sensor, and a capacitive pressure sensor. The capacitive pressure sensor may include at least two parallel plates having conductive materials. When a force is applied to the pressure sensor 180A, a capacitance between electrodes changes. The electronic device determines intensity of pressure based on a change of the capacitance. When a touch operation is performed on the display screen 140, the electronic device detects strength of the touch operation based on the pressure sensor 180A. The electronic device may also calculate a touch position based on a detected signal of the pressure sensor 180A. In some embodiments, touch operations performed on a same touch position with different touch operation strength may correspond to different operation instructions.

The touch sensor 180B is also referred to as a "touch device". The touch sensor 180B may be disposed in the display screen 140. The touch sensor 180B and the display screen 140 form a touchscreen, also referred to as a "touch-controlled screen". The touch sensor 180B is configured to detect a touch operation performed on or near the touch sensor 180B. The touch sensor may transmit the detected touch operation to the application processor, to determine a type of a touch event. The touch sensor may provide, by using the display screen 140, visual output related to the touch operation. In some other embodiments, the touch sensor 180B may be alternatively disposed on a surface of the electronic device, and is located at a different position from the display screen 140.

In some embodiments, the pressure sensor 180A and the touch sensor 180B may be configured to detect a touch operation performed by the user on a control, an image, an icon, a video, or the like displayed on the display screen 140. The electronic device may perform a corresponding procedure in response to the touch operation detected by the pressure sensor 180A and the touch sensor 180B. For specific content of the procedure performed by the electronic device, refer to the following embodiment content.

The key 190 includes a power-on key, a volume key, and the like. The key 190 may be a mechanical key, or may be a touch key: The electronic device may receive key input and generate key signal input related to user setting and function control of the electronic device.

The technical solutions described in the following embodiments all can be implemented in the electronic device 100 having the foregoing hardware architecture.

For ease of understanding, in the following embodiments of this application, an electronic device having the structure shown in FIG. 1 is used as an example to specifically describe the video processing method provided in the embodiments of this application.

In the following embodiments of this application, an example in which an electronic device is a mobile phone, a camera application is installed in the mobile phone, and the camera application enables a camera to shoot a video is used to describe in detail the video processing method provided in this application.

Embodiment 1

In some embodiments of this application, a user may manually enable or disable a "Magic Take" function provided in the embodiments of this application. The following describes a portal of "Magic Take" with reference to FIG. 2.

Figure 2A:
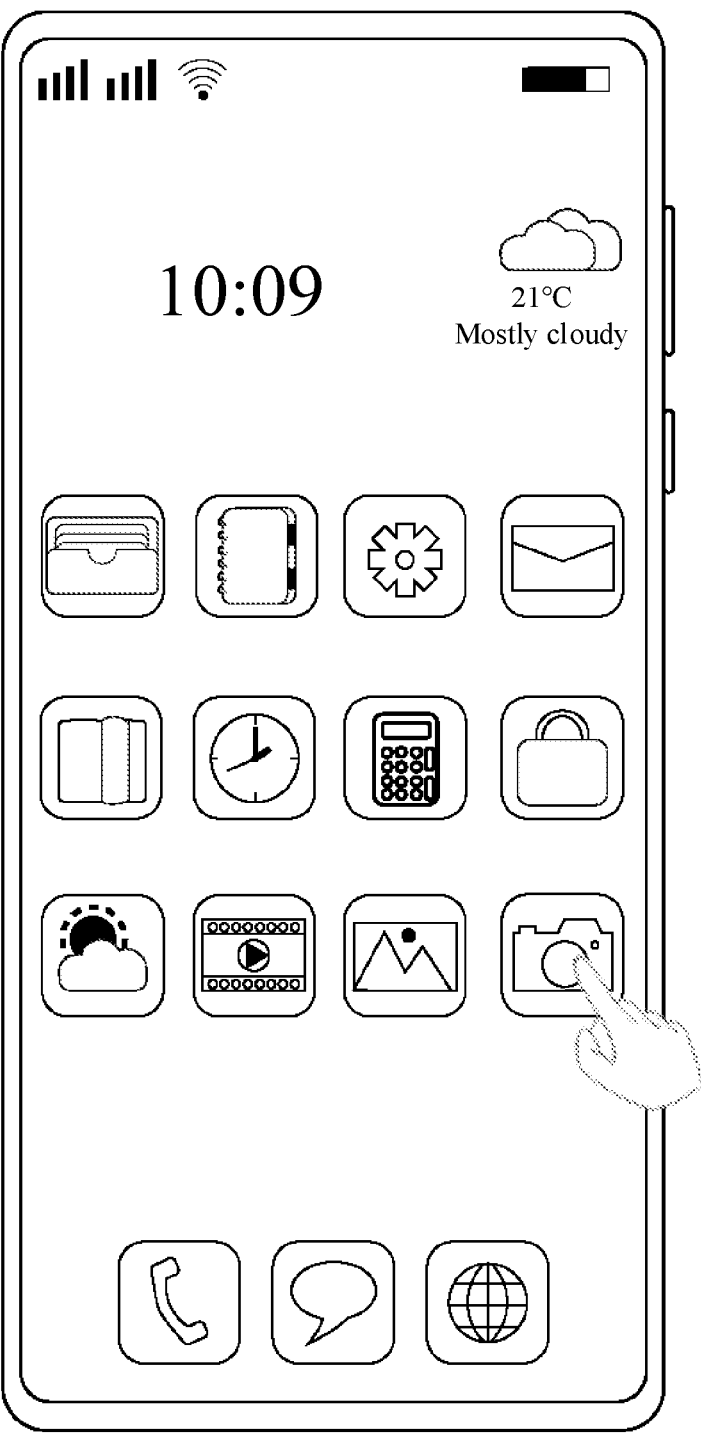
FIG. 2(A), FIG. 2(B), FIG. 2(C), and FIG. 2(D) are schematic diagrams of an example of enabling "Magic Take" according to Embodiment 1 of this application.

For example, the user may touch a specific control on a screen of a mobile phone, press a specific physical key or key combination, input a voice, use a mid-air gesture, or the like, to indicate the mobile phone to enable a camera application. FIG. 2(A) shows an implementation in which the user enables the camera application. As shown in FIG. 2(A), the user taps a camera application icon displayed on the display screen of the mobile phone, to input a camera enabling indication. In response to receiving the camera enabling indication of the user, the mobile phone enables a camera, to display a shooting interface shown in FIG. 2(B) or FIG. 2(C).

Figure 2B:
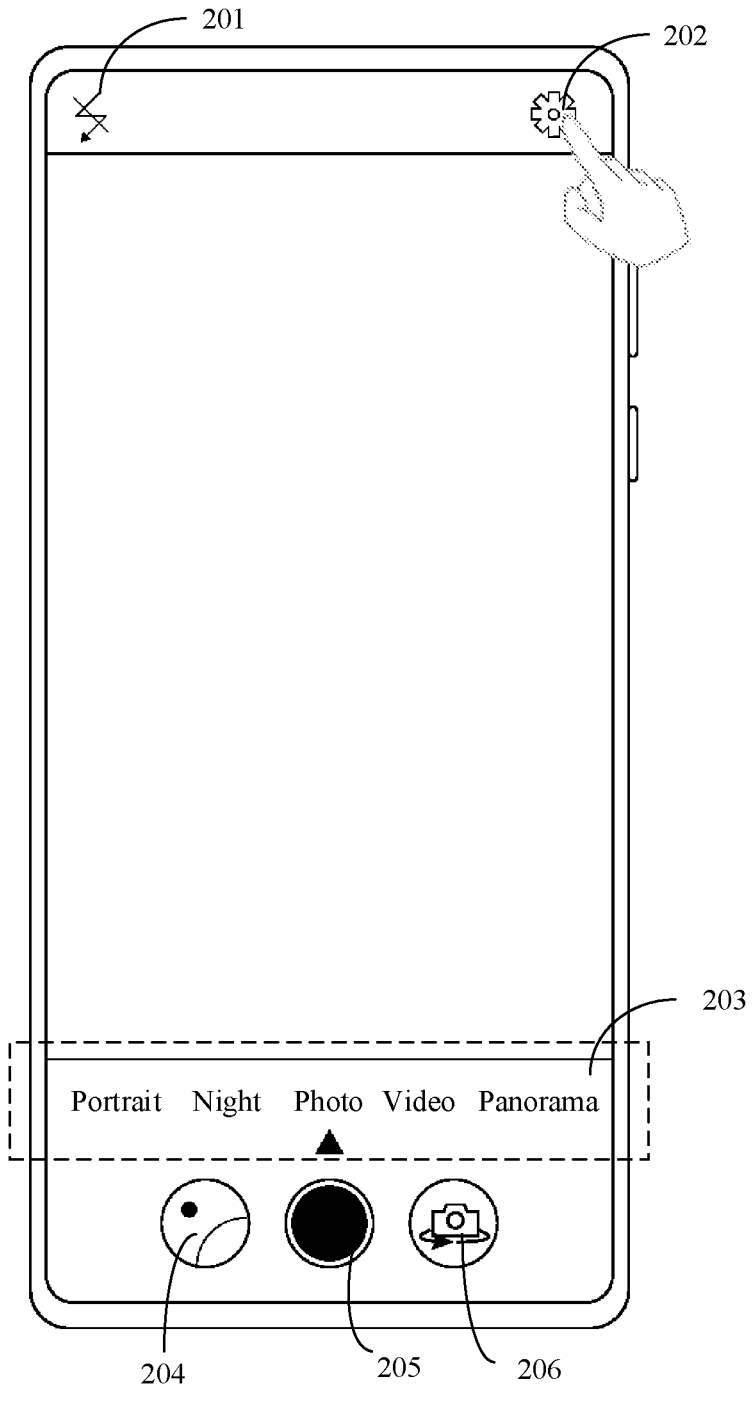
Figure 2C:
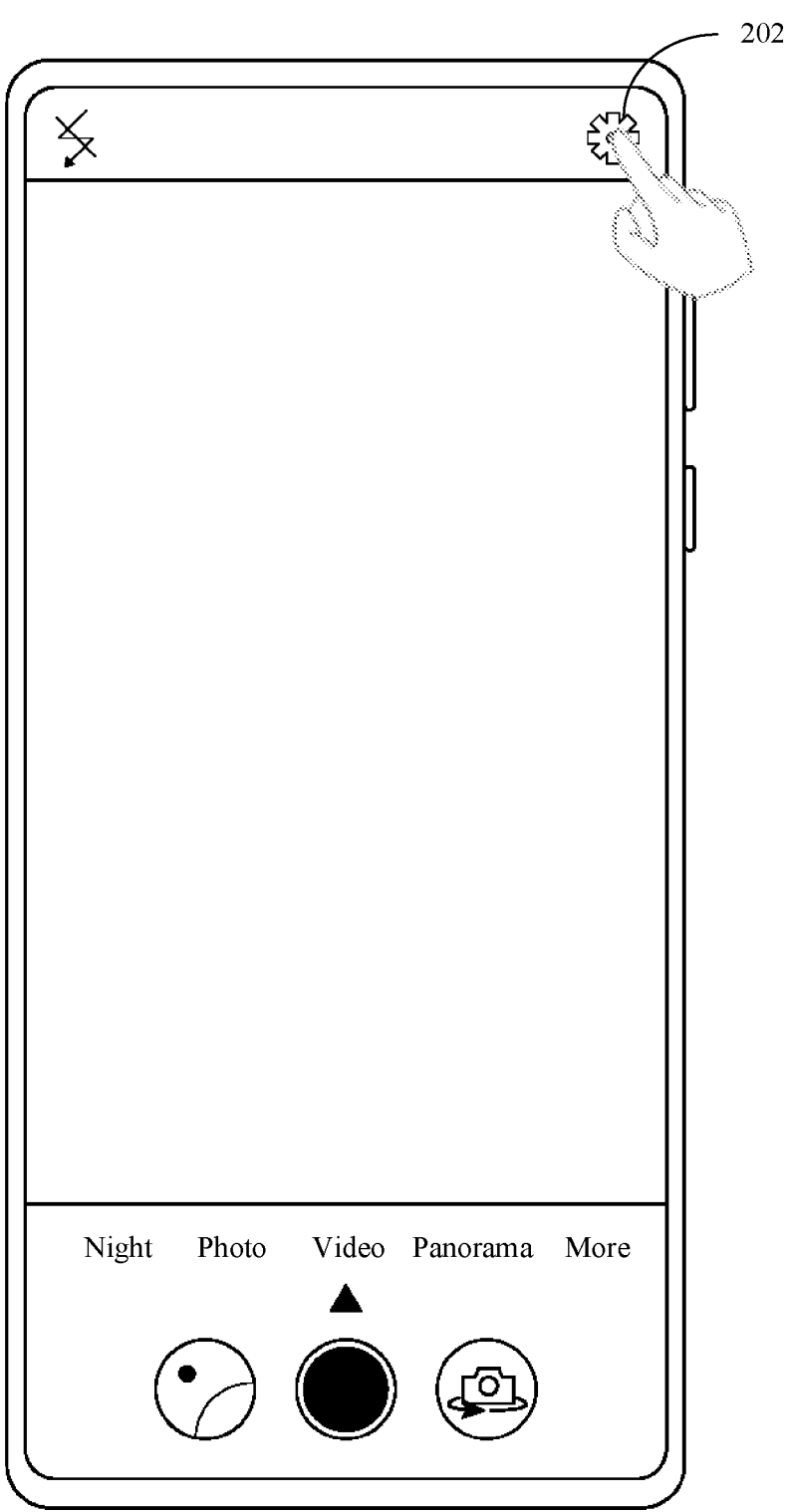
Figure 2D:
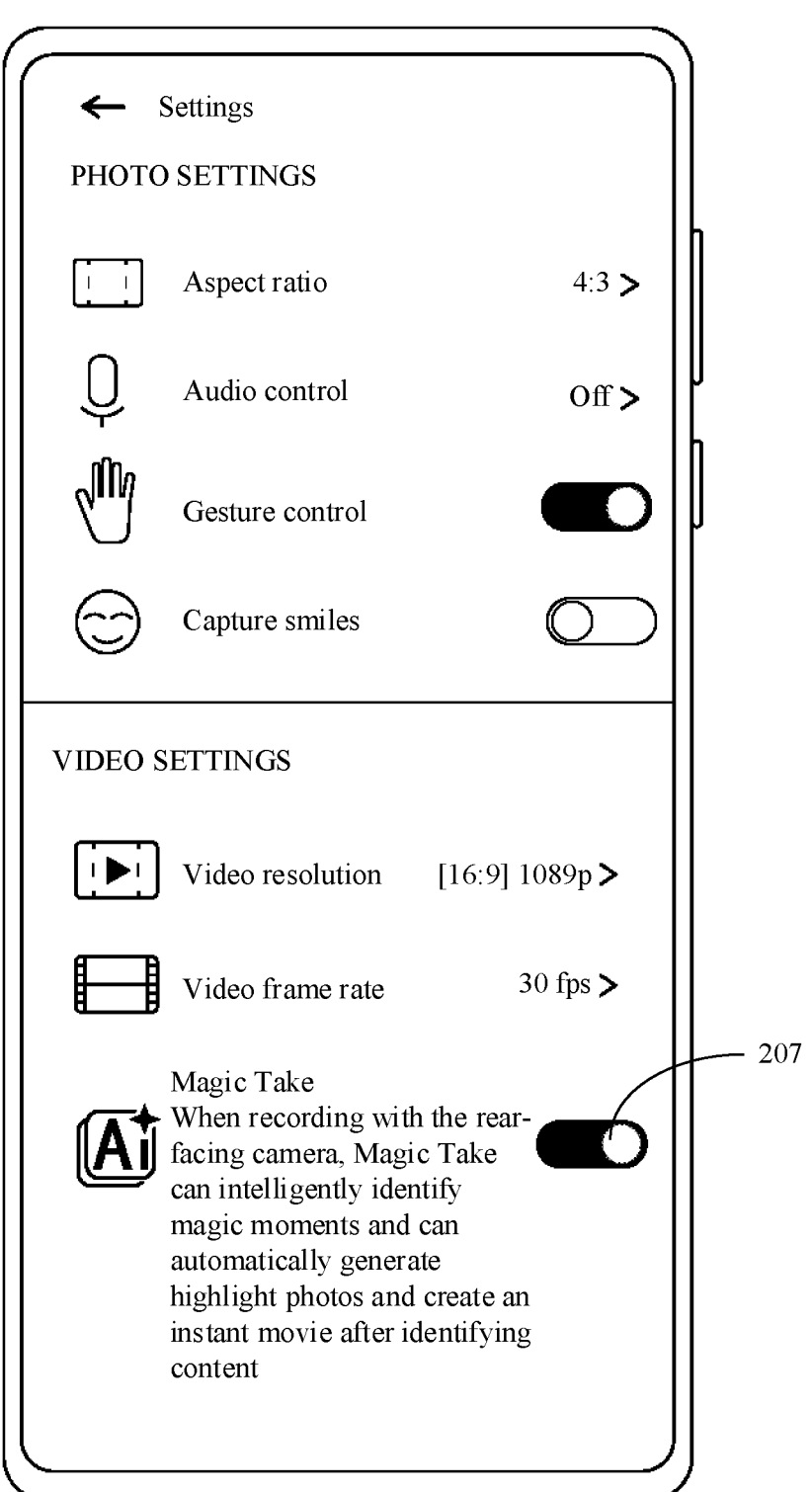

The shooting interface shown in FIG. 2(B) is a shooting interface displayed when the mobile phone is in a photo mode, and the shooting interface displayed in FIG. 2(C) is a shooting interface displayed when the mobile phone is in a video mode. For example, in FIG. 2(B), the shooting interface of the mobile phone includes a control 201 for turning on or turning off a camera flash, a setting control 202, a switching list 203, a control 204 for displaying a previously shot image, a control 205 for controlling shooting, and a control 206 for switching between a front-facing camera and a rear-facing camera.

The control 201 for turning on or turning off the camera flash is used to control whether to enable the camera flash when the camera performs shooting.

The setting control 202 may be used to set shooting parameters and shooting functions, for example, set an aspect ratio, set gesture control, set capture smiles, and set video resolution.

The switching list 203 includes a plurality of modes of the camera, and the user can implement switching operation of the plurality of modes of the camera by sliding the switching list leftward or rightward. For example, the switching list shown in FIG. 2(B) includes Portrait, Night, Photo, Video, and Panorama. Other modes not shown in FIG. 2(B) are displayed in hidden manners, and the user can display, by sliding the switching list leftward or rightward, a mode displayed in a hidden manner.

The control 204 for displaying a previously shot image is used to display a thumbnail of an image previously shot by the camera or a cover thumbnail of a video previously shot by the camera. The user may touch the control 204 for displaying a previously shot image, so that the display screen displays the image or video previously shot by the camera. The image or video previously shot by the camera is an image or a video that is shot by the camera before current shooting and whose shooting time is closest to current shooting time.

The control 205 for controlling shooting is a control provided for the user to enable shooting. In the photo mode of the mobile phone, the camera can shoot one frame of image when the user touches once the control 205 for controlling shooting. Certainly, the camera may alternatively shoot a plurality of frames of images, and select only one frame of image for display. In the video mode of the mobile phone, the camera starts recording when the user touches the control 205 for controlling shooting.

The control 206 for switching between the front-facing camera and the rear-facing camera is used to implement switching operation of a plurality of cameras of the mobile phone. Usually, the mobile phone includes a camera (referred to as the front-facing camera) on a same side as the display screen, and a camera (referred to as the rear-facing camera) located on a housing of the mobile phone. The user can implement switching operation between the front-facing camera and the rear-facing camera of the mobile phone by touching the control 206 for switching between the front-facing camera and the rear-facing camera.

As shown in FIG. 2(B) or FIG. 2(C), the user controls, by tapping the setting control 202, the mobile phone to display a setting interface. For example, the setting interface may be shown in FIG. 2(C). The setting interface shown in FIG. 2(C) displays an option 207 for enabling "Magic Take", and the option 207 is used to enable a Magic Take function. That is, when the mobile phone shoots a video in the video mode after the user enables the function, the mobile phone automatically generates, by using the video processing method provided in the embodiments of this application, a highlight image and a short video while shooting the video. Certainly, the user may also manually disable the Magic Take function in the video mode by using the option 207.

Usually, the "Magic Take" option 207 shown in FIG. 2(C) is in an on state by default. That is, the mobile phone already has the "Magic Take" function when the mobile phone is powered on for the first time or updates a system, the "Magic Take" option 207 in the setting interface shown in FIG. 2(C) is in the on state, and the "Magic Take" function of the mobile phone is enabled.

It may be understood that the setting interface may further include other function setting controls, for example, photo setting controls and video setting controls shown in FIG. 2(C). The photo setting controls include an aspect ratio setting control, an audio control setting control, a gesture control setting control, a capture smiles setting control, and the like. The video setting controls include a video resolution setting control, a video frame rate setting control, and the like.

The foregoing describes the method for triggering the mobile phone to enter a "Magic Take" mode, but this application is not limited to entering "Magic Take" in the video mode. In some embodiments of this application, the user may enable the "Magic Take" function in other manners.

Figure 3A:
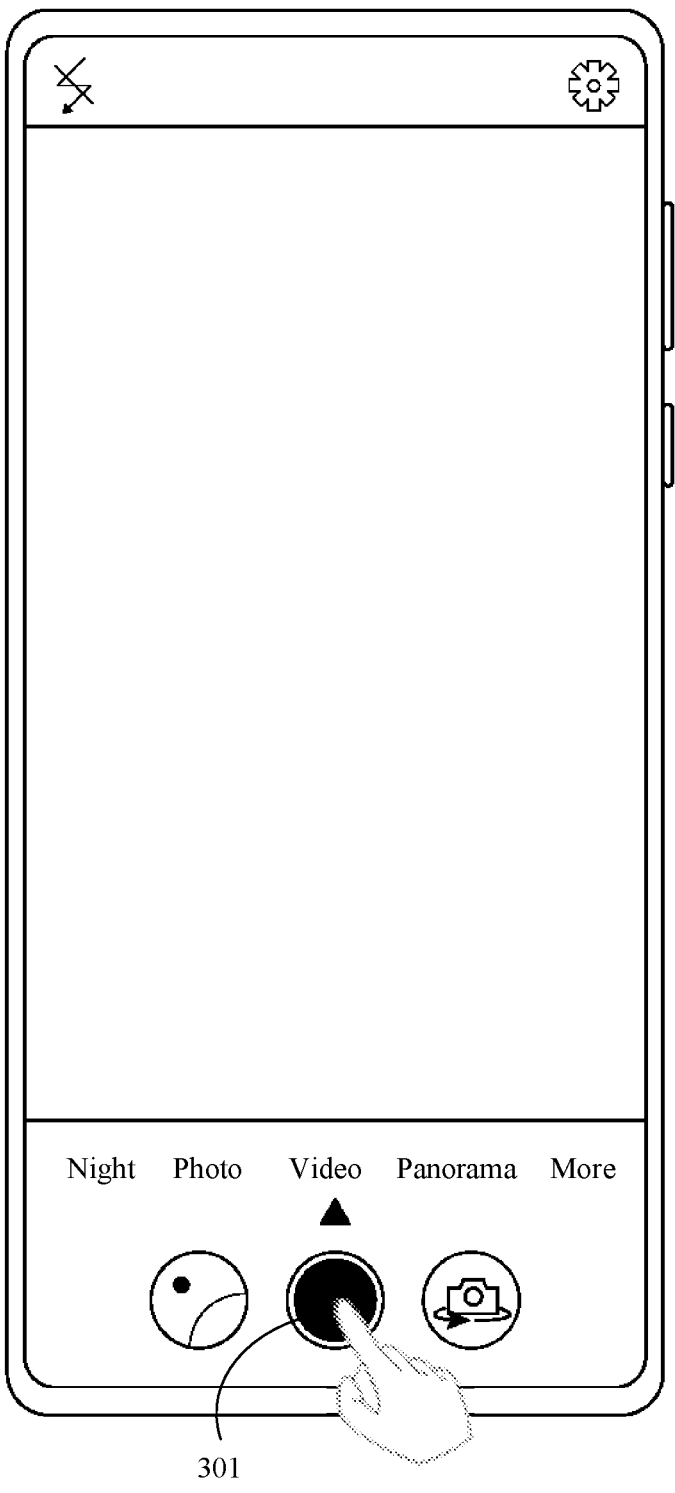
FIG. 3(A), FIG. 3(B), FIG. 3(C), and FIG. 3(D) are schematic diagrams of an example of a graphical user interface of "Magic Take" according to Embodiment 1 of this application.
Figure 3B:
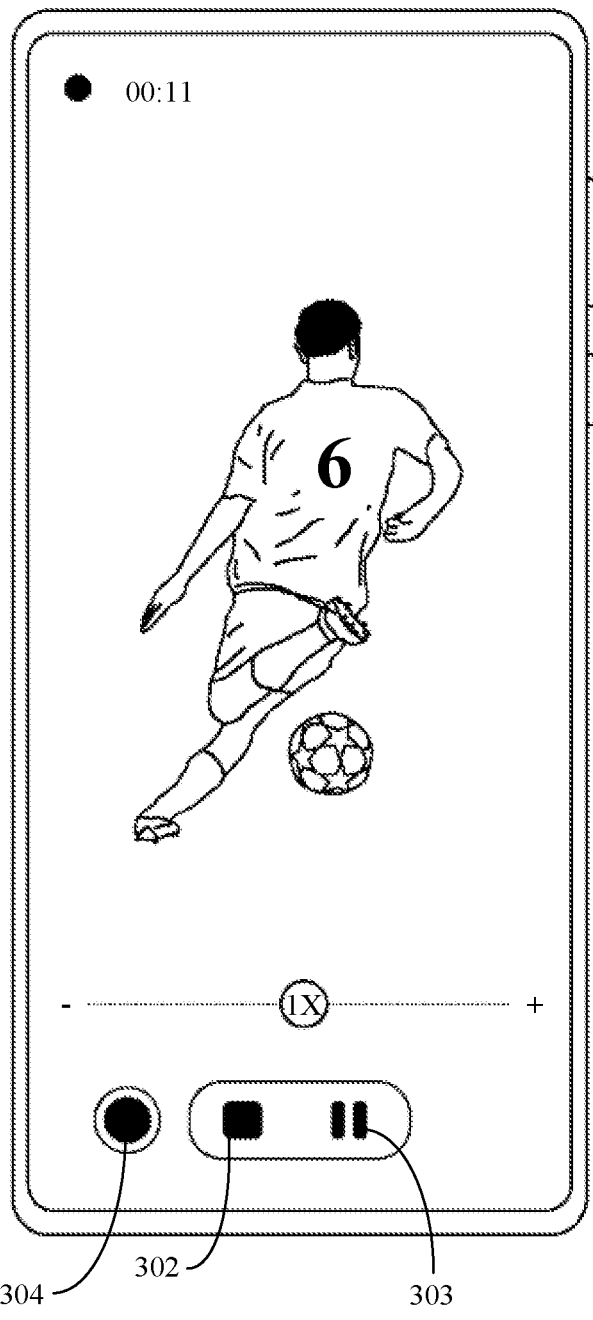

After enabling the "Magic Take" option, the user can control the mobile phone to start shooting a video. For example, referring to FIG. 3(A), the user can tap a control 301 for controlling shooting, to control the mobile phone to start shooting a video. The mobile phone enables, in response to the tap operation of the user, the camera to shoot a video. An interface shown in FIG. 3(B) displays a picture in a football match process shot by the user by using the mobile phone. The interface shown in FIG. 3(B) includes a stop control 302, a pause control 303, and a photo key 304. In a video shooting process, the user may pause shooting by tapping the pause control 303, may also end shooting by tapping the stop control 302, and may further manually capture a photo by tapping the photo key 304.

Figure 3C:
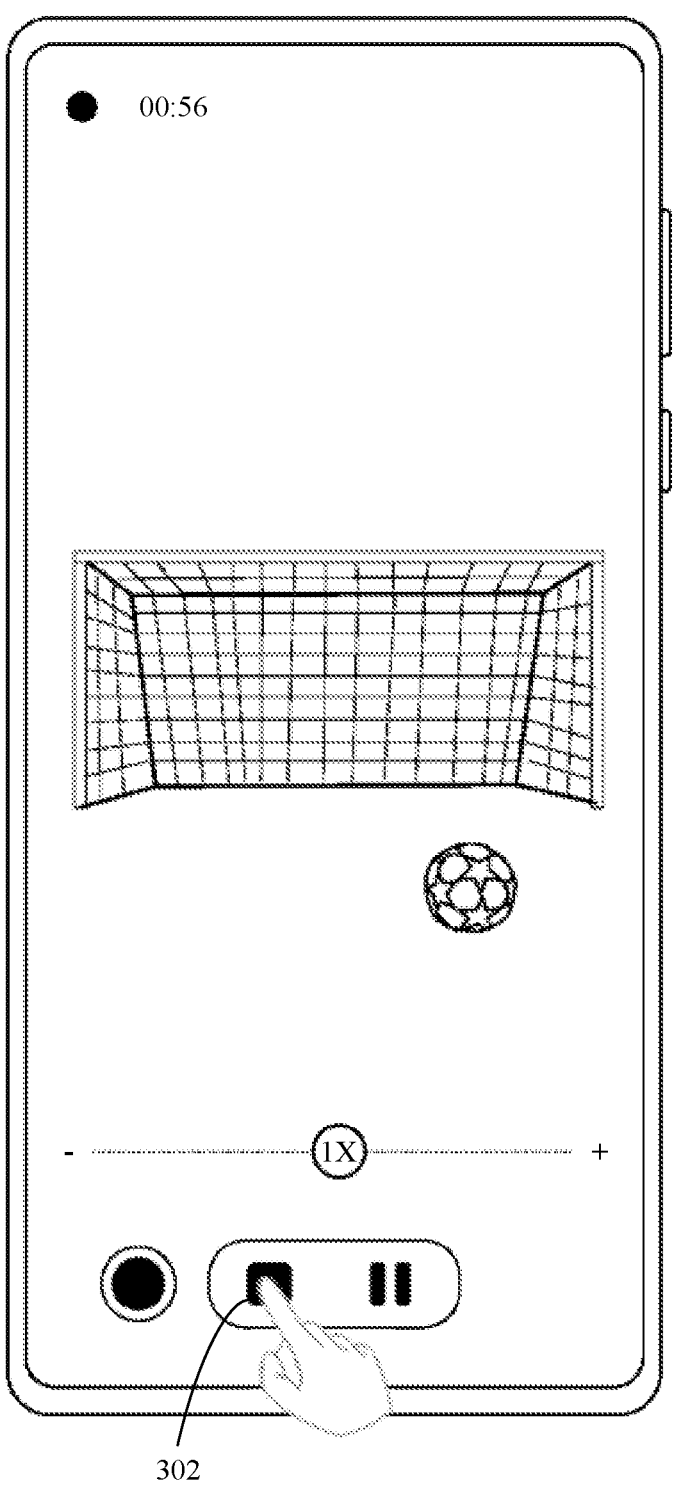
Figure 3D:
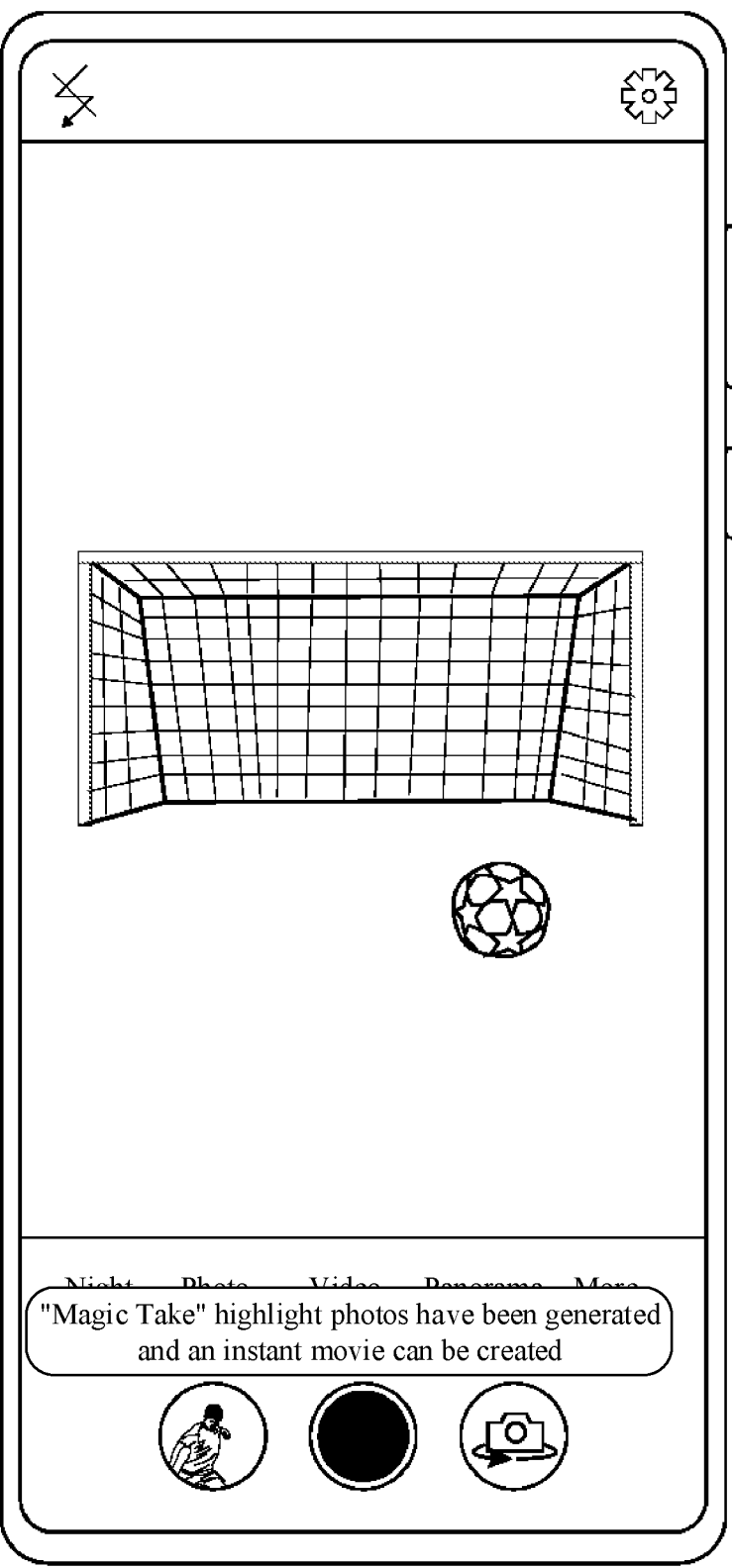

In an interface shown in FIG. 3(C), the user can tap the stop control 302 at the fifty-sixth second to end the shooting process, so that a video with duration of 56 seconds can be obtained. In addition, after shooting ends, the display screen of the mobile phone can enter a shooting interface, and when the "Magic Take" function of the mobile phone is used for the first time, a generation prompt for guiding "Magic Take" may be further displayed in the shooting interface. For example, a shooting interface shown in FIG. 3(D) displays a dialog box of the generation prompt of "Magic Take", and the dialog box displays a text prompt ""Magic Take" highlight photos have been generated and an instant movie can be created". In addition, the user may control, by tapping any region in the interface shown in FIG. 3(D), the dialog box of the generation prompt of "Magic Take" to disappear. Alternatively, for the mobile phone, the dialog box of the generation prompt of "Magic Take" may be configured to automatically disappear after being displayed for specific duration, for example, 5 seconds.

Certainly, after the "Magic Take" function of the mobile phone is enabled once, when the user shoots a video again and taps the stop control to end shooting, a shooting interface displayed on the display screen of the mobile phone does not include a generation prompt for guiding "Magic Take".

It should be noted that when duration of a video shot by the mobile phone meets a specific duration requirement, for example, 15 seconds, based on a requirement of the Magic Take mode, the mobile phone may capture one or more highlight images from the video shot by the mobile phone, and generate a selected video. When the mobile phone can capture one or more highlight images, the shooting interface shown in FIG. 3(D) can display the dialog box of the generation prompt of "Magic Take", and the dialog box displays the text prompt ""Magic Take" highlight photos have been generated and an instant movie can be created".

Figure 4A:
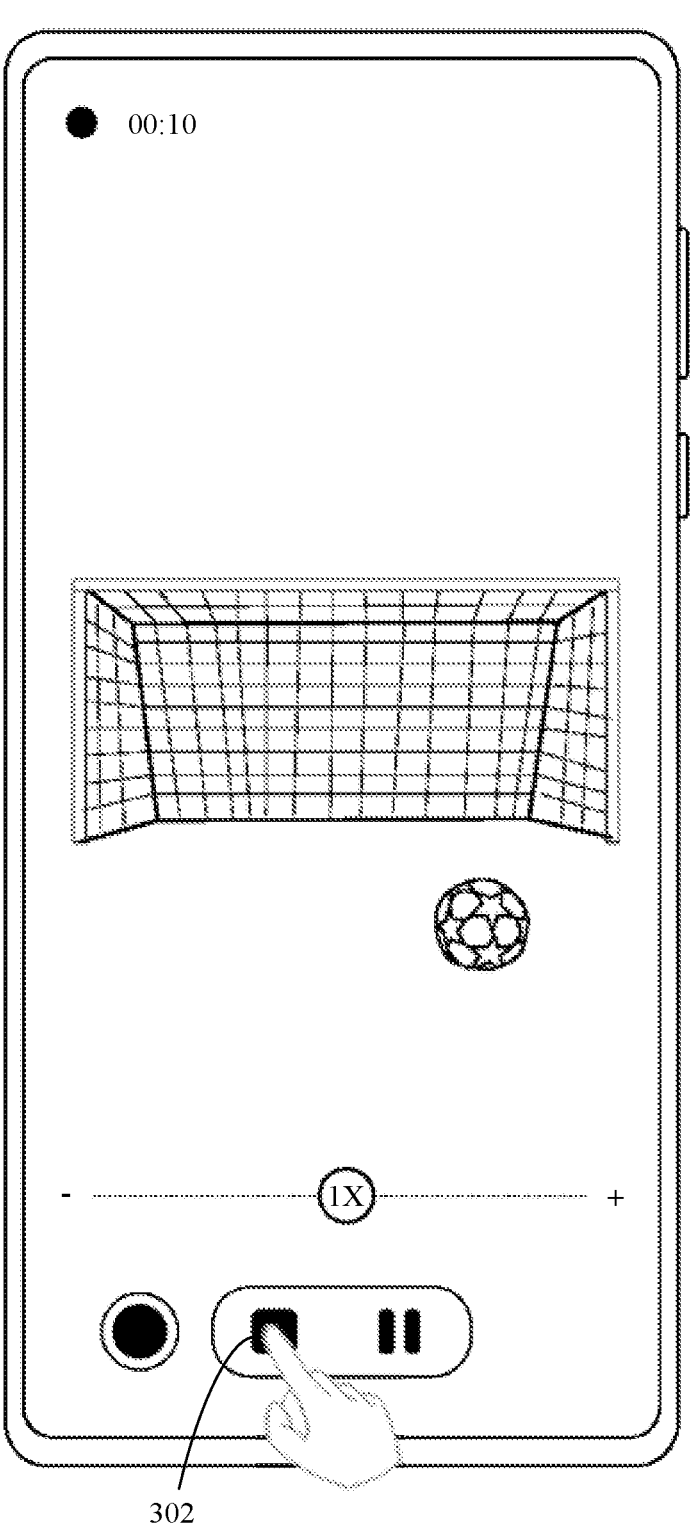
FIG. 4(A), FIG. 4(B), FIG. 4(C), and FIG. 4(D) are schematic diagrams of another example of a graphical user interface of "Magic Take" according to Embodiment 1 of this application.
Figure 4B:
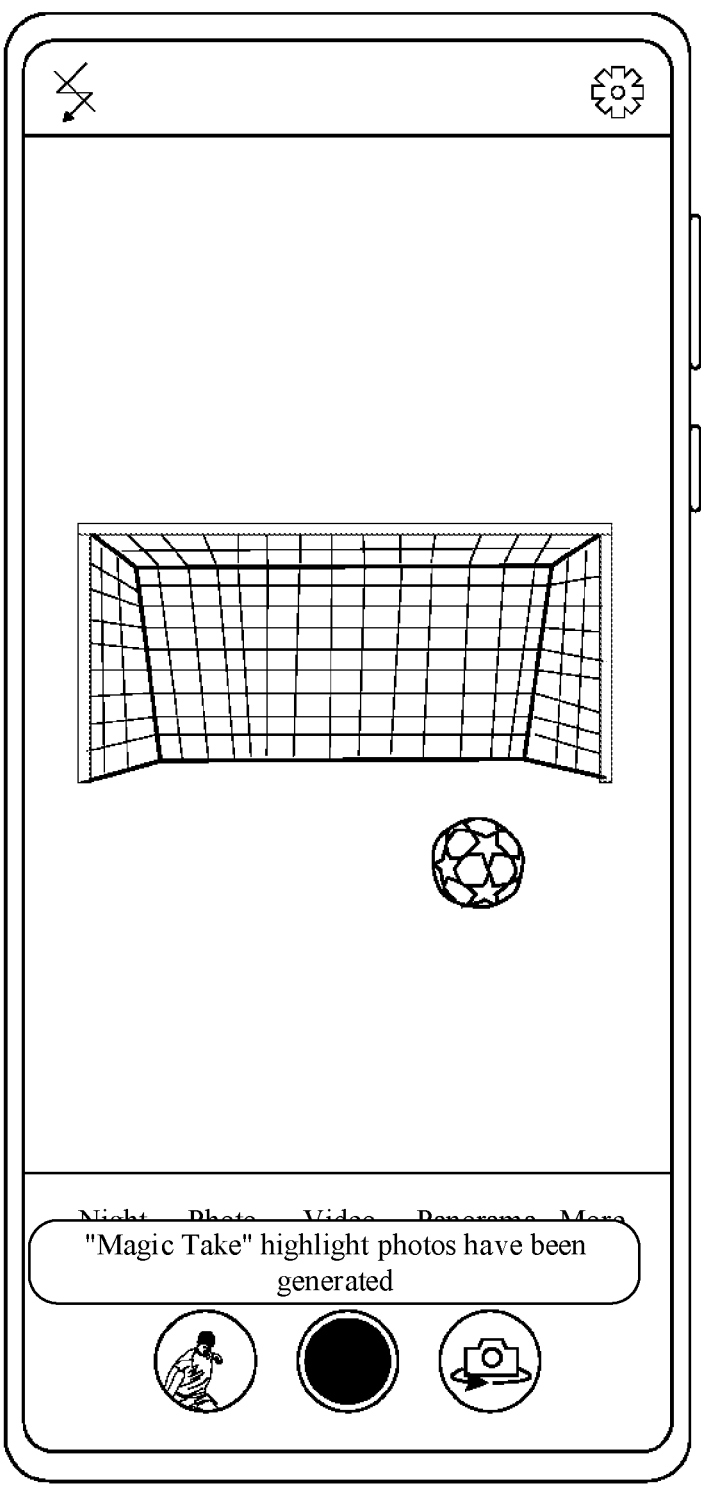

However, application scenarios in which the user shoots a video may further include the following two application scenarios: In a first application scenario, video shooting duration is relatively short and does not meet a requirement of video shooting duration of the Magic Take mode. In a second application scenario, video shooting duration meets the requirement of the video shooting duration of the Magic Take mode, but the mobile phone identifies no highlight image from a shot video. In addition, in the second application scenario, it is usually required that shooting time of the user should be greater than a requirement of other duration, and the duration is greater than the video shooting duration of the Magic Take mode, for example, 30 seconds. In addition, although the mobile phone identifies no highlight image from the shot video, the mobile phone can identify an image of relatively good quality, and the image of relatively good quality can be used to generate a selected video proposed below:

In the first application scenario, when the user shoots a video in the Magic Take mode for the first time, and as shown in FIG. 4(A), the user taps the stop control 302 when shooting reaches 10 seconds, a shooting interface displayed by the mobile phone is shown in FIG. 4(B), and a text in a dialog box of a generation prompt of "Magic Take" is: "Magic Take" highlight photos have been generated.

Figure 4C:
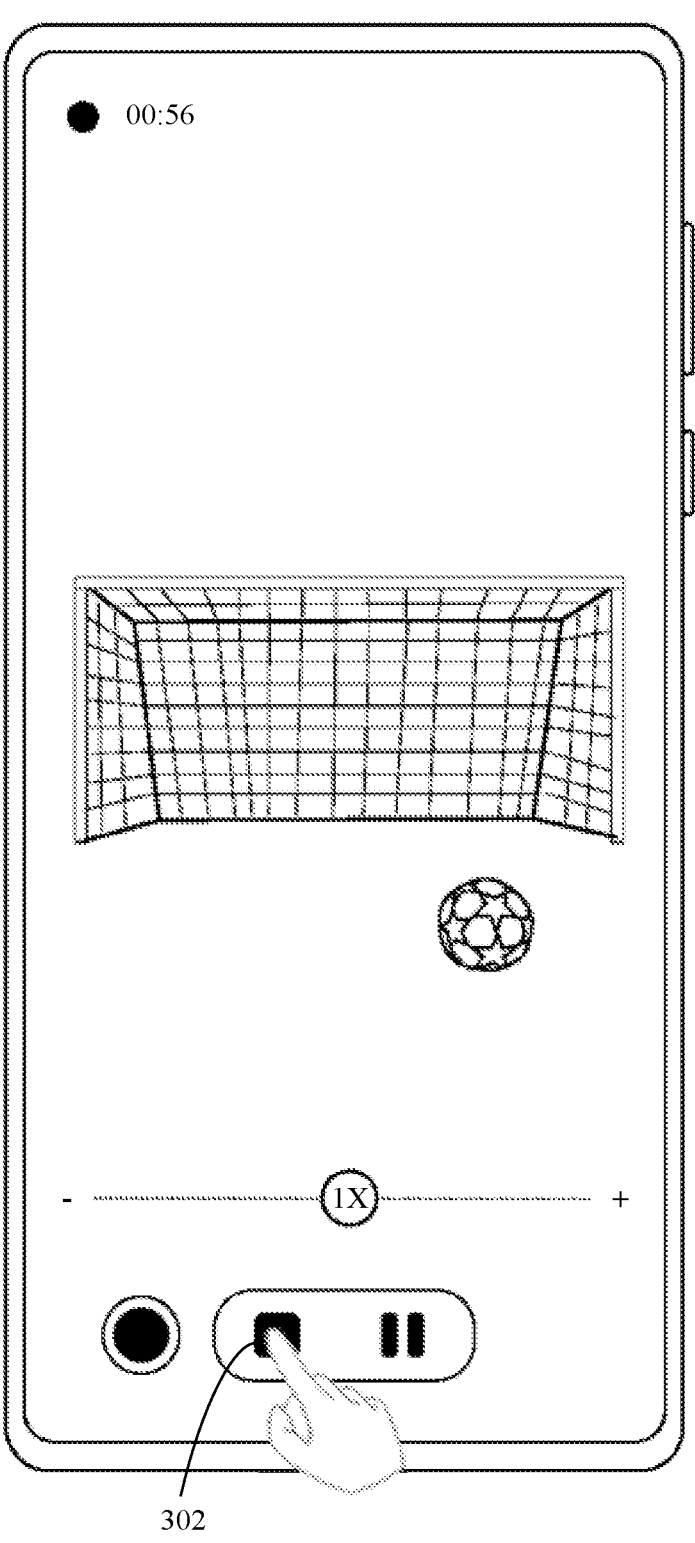
Figure 4D:
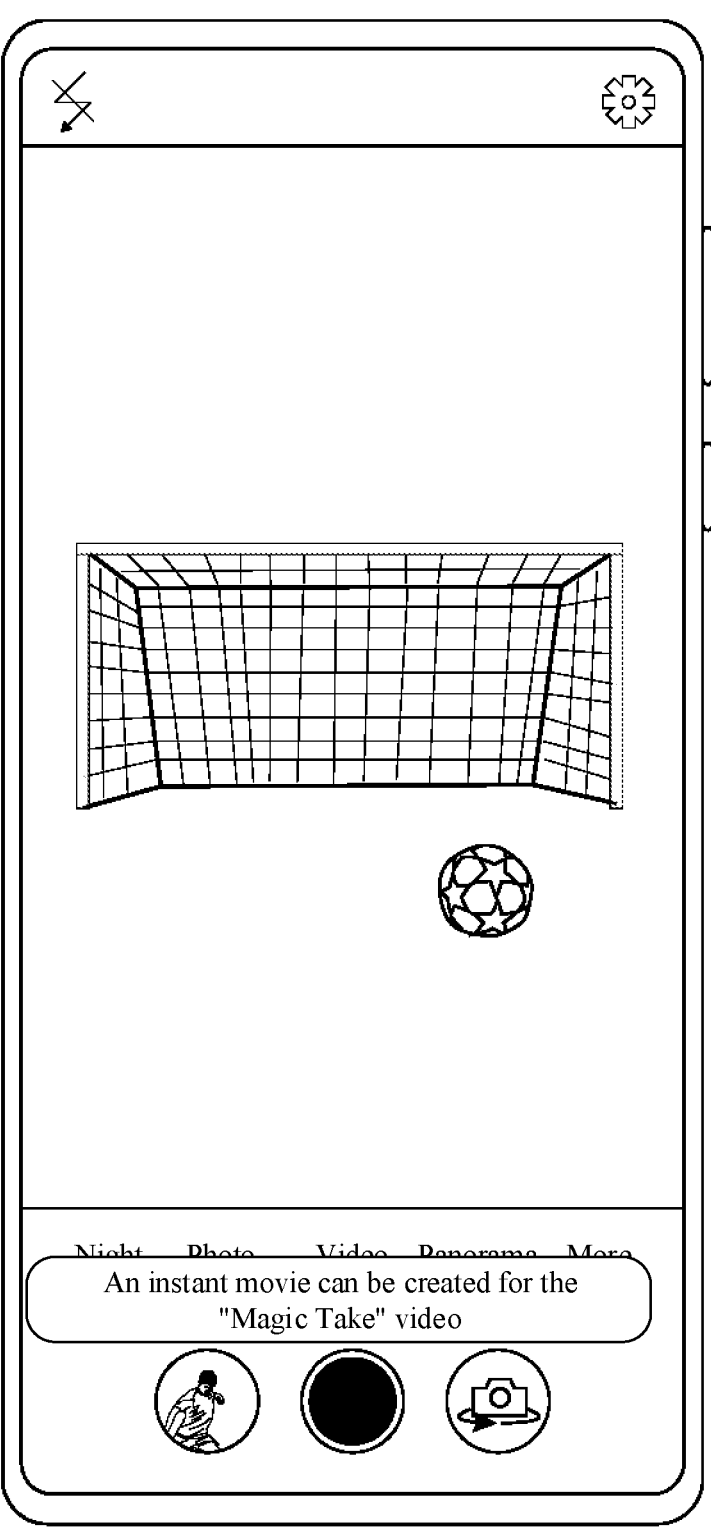

In the second application scenario, when the user shoots a video in the Magic Take mode for the first time, and as shown in FIG. 4(C), the user taps the stop control 302 when shooting reaches 56 seconds, a shooting interface displayed by the mobile phone is shown in FIG. 4(D), and a text in a dialog box of a generation prompt of "Magic Take" is: An instant movie can be created for the "Magic Take" video.

In addition, after the mobile phone displays the shooting interface of the mobile phone in FIG. 4(B), when the mobile phone determines, for the first time, that the mobile phone shoots a video meeting the second application scenario, after the user taps the stop control 302 shown in FIG. 4(C), the mobile phone may further display once the shooting interface shown in FIG. 4(D). Alternatively, when the mobile phone determines, for the first time, that the mobile phone shoots a video whose duration meets the requirement of the video shooting duration of the Magic Take mode and from which a highlight image can be identified, after the user taps the stop control 302 shown in FIG. 3(C), the mobile phone displays once the shooting interface shown in FIG. 3(D).

In addition, after the mobile phone displays the shooting interface of the mobile phone in FIG. 4(D), when the mobile phone determines, for the first time, that the mobile phone shoots a video meeting the first application scenario, after the user taps the stop control 302 shown in FIG. 4(A), the mobile phone displays once the shooting interface shown in FIG. 4(B). Alternatively, when the mobile phone determines, for the first time, that the mobile phone shoots a video whose duration meets the requirement of the video shooting duration of the Magic Take mode and from which a highlight image can be identified, after the user taps the stop control 302 shown in FIG. 3(C), the mobile phone displays once the shooting interface shown in FIG. 3(D).

It should be noted that, when the user shoots a video in the Magic Take mode of the mobile phone, the mobile phone can automatically identify a highlight image in the shot video by using an identification model. In some embodiments, a highlight image identification model is set in the mobile phone, and when a video is input to the highlight image identification model, the identification model can score highlight degrees of images in the input video to obtain highlight degree score values of the images in the video. The mobile phone may determine a highlight image in the video by using the highlight degree score values of the images. Usually, a larger highlight degree score value of an image indicates a higher probability that the image is a highlight image.

In addition, a scene of a video can be further identified in a video shooting process. After it is identified that shooting of a video clip of a scene is completed, the video clip of the scene is input to the foregoing highlight image identification model, and the identification model scores all images included in the video clip of the scene in terms of highlight degree, to obtain highlight degree score values of the images in the video. The mobile phone may determine a highlight image in the video by using the highlight degree score values of the images. Certainly, a larger highlight degree score value of an image indicates a higher probability that the image is a highlight image.

In some embodiments, the mobile phone may be configured to obtain a fixed quantity of highlight images, for example, five highlight images. Based on this, the mobile phone selects five images with larger highlight degree score values as the highlight images.

In some other embodiments, alternatively, a limited quantity of highlight images may not be configured for the mobile phone, and the mobile phone may select, as highlight images, all images with highlight degree score values larger than a specific value.

Figure 5A:
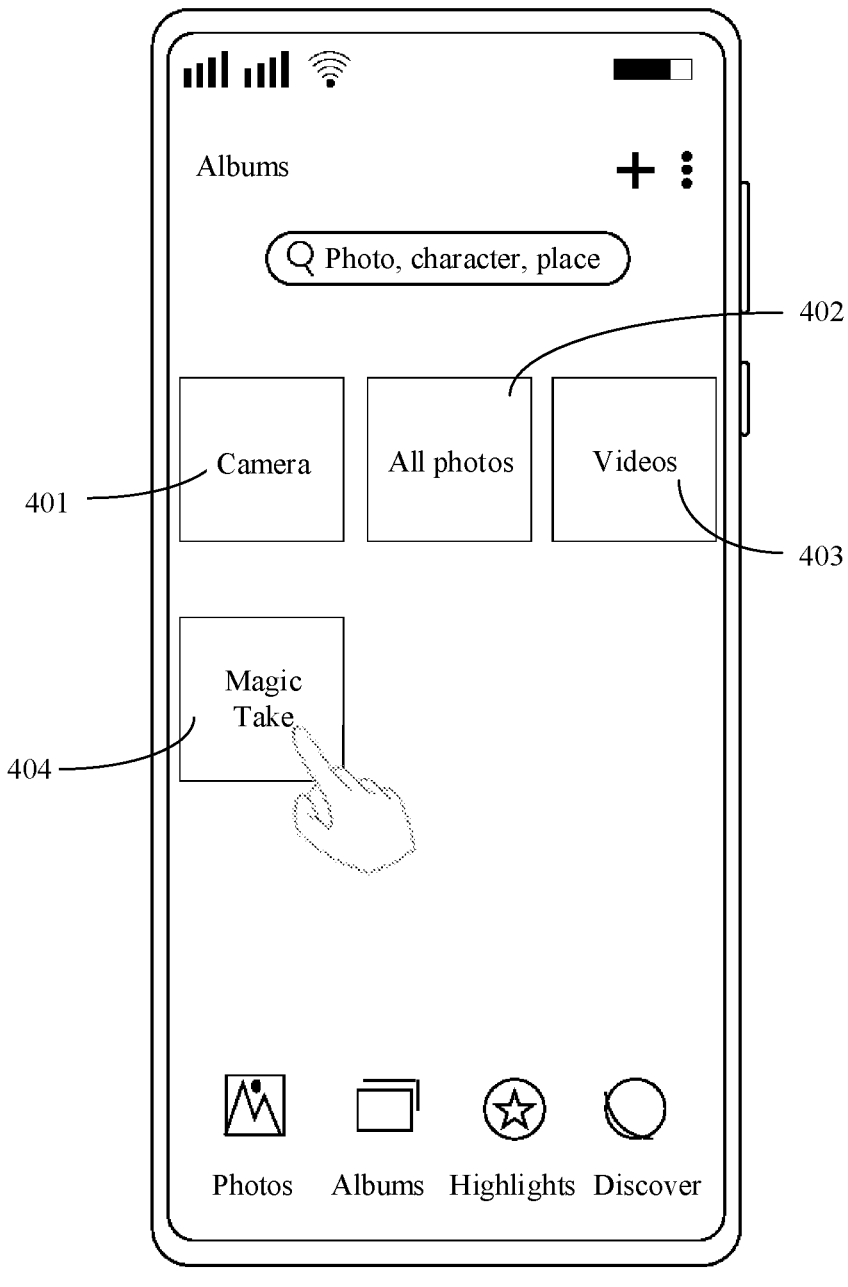
FIG. 5(A) and FIG. 5(B) are schematic diagrams of another example of a graphical user interface of "Magic Take" according to Embodiment 1 of this application.

After the mobile phone ends shooting of a video, the mobile phone obtains the shot video and one or more highlight images in the video, and the mobile phone may further save the shot video and the highlight images in a gallery. In an example, FIG. 5(A) shows an album display interface of the gallery, and the album display interface displays, in a form of a folder, all photos and videos saved by the mobile phone. For example, the album display interface shown in FIG. 5(A) includes a camera folder 401, an all photos folder 402, a videos folder 403, and a Magic Take folder 404. Certainly, the album display interface may further include other folders. Folders displayed in the camera display interface are not limited in this application.

Usually, the camera folder 401 includes all photos and videos shot by the camera of the mobile phone, the all photos folder 402 includes all photos and videos saved by the mobile phone, the videos folder 403 includes all videos saved by the mobile phone, and the Magic Take folder 404 includes all highlight images that are saved by the mobile phone and that are shot in the Magic Take mode.

Figure 5B:
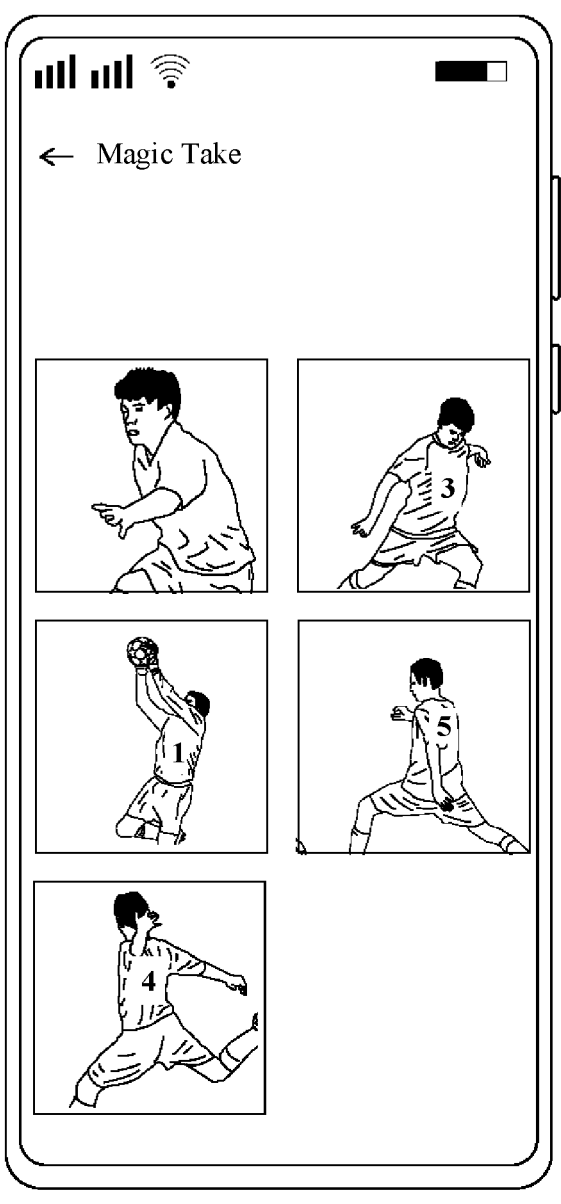

FIG. 5(B) shows a display interface of the Magic Take folder. The display interface displays thumbnails of five highlight images in the foregoing 56-second video shot by the mobile phone by using Magic Take, and the five highlight images are automatically captured by the mobile phone from the shot 56-second video.

After the mobile phone saves, in the gallery, a shot video and a highlight image in the video, the user can view the video and the highlight image in the video by using the gallery application. For example, the user taps, in a shooting interface shown in FIG. 6(A), a control 501 for displaying a previously shot image, or the user taps a cover thumbnail of a video 502 in a photo display interface that is of the gallery and that is shown in FIG. 6(B). In response to the tap operation of the user, the mobile phone displays a detail interface of the video 502 on the display screen of the mobile phone.

A lower left corner of the cover thumbnail that is of the video 502 and that is shown in FIG. 6(B) displays a video-specific badge reminder of the "Magic Take" function. The video-specific badge reminder is used to explain, to the user, that the video 502 corresponding to the cover thumbnail is shot by the mobile phone by using the "Magic Take" function.

The cover thumbnail that is of the video 502 and that is shown in FIG. 6(B) has a different size from thumbnails of an image A and an image B. The image A and the image B may be images shot by the mobile phone without enabling of the Magic Take function. For example, the cover thumbnail that is of the video 502 and that is shown in FIG. 6(B) is larger than the thumbnails of the image A and the image B. Certainly, the cover thumbnail that is of the video 502 and that is shown in FIG. 6(B) may be the same as thumbnails of other photos and videos (videos shot without enabling of the Magic Take function) in the gallery. This is not limited in this embodiment of this application.

When the display screen of the mobile phone displays the detail interface of the video 502 (which may also be referred to as a browsing interface of the video 502) for the first time, the detail interface displays a mask guide. When the display screen of the mobile phone does not display the detail interface of the video 502 for the first time, the detail interface displays no mask. For example, a detail interface that is of the video 502 and that displays a mask guide is shown in FIG. 6(C), and a detail interface that is of the video 502 and that displays no mask guide is shown in FIG. 6(D). It should be further noted that, the video 502 may be understood as a video shot by the mobile phone in the Magic Take mode for the first time. Therefore, the display screen of the mobile phone displays the detail interface of the video 502 for the first time. It may be understood that the mobile phone displays, for the first time, a video shot by the mobile phone in the Magic Take mode for the first time. Only in this case, a detail interface of the video displays a mask guide. In addition, when the mobile phone displays the mask guide on the detail interface of the video when displaying, for the first time, the video shot by the mobile phone in the Magic Take mode for the first time, the user can be reminded of the Magic Take function.

The detail interface that is of the video 502 and that is shown in FIG. 6(C) includes a thumbnail region 504 of highlight images in the video 502, a control 505, and a play control 506. The thumbnail region 504 of the highlight images in the video 502 is exposed without being covered by a mask, and other regions of the display screen are covered by the mask.

The thumbnail region 504 of the highlight images in the video 502 includes the cover thumbnail of the video 502 and thumbnails of a plurality of highlight images of the video 502. The cover thumbnail of the video 502 usually ranks first, and the thumbnails of the plurality of highlight images may be arranged based on shooting time of the highlight images and are located behind the cover thumbnail of the video 502. As described above, the highlight image may be extracted from the video by automatically identifying, when the mobile phone shoots the video, a magic moment picture included in the video. In addition, the detail interface of the video 502 further includes a reminder dialog box, and the reminder dialog box displays a text ""Magic Take" intelligently captures multiple magic moments for you". The reminder dialog box is usually shown in FIG. 6(C), is located above the thumbnail region 504 of the highlight images in the video 502, and is used to prompt the user for content displayed in the thumbnail region 504 of the highlight images in the video 502, to guide the user in viewing the highlight images in the video 502. Certainly, the displayed text and the setting position of the reminder dialog box shown in FIG. 6(C) are displayed for illustration purposes and do not constitute a limitation on the reminder dialog box. The user may control, by tapping any region in the detail interface that is of the video 502 and that is shown in FIG. 6(C), the reminder dialog box to disappear. Alternatively, for the mobile phone, the reminder dialog box may be configured to automatically disappear after being displayed for specific duration, for example, 5 seconds.

The control 505 is used to generate a selected video based on the highlight images in the video 502.

The play control 506 is used to control playback of the video 502. For example, as shown in FIG. 6(D), the play control 506 includes a start or stop control 507, a slidable progress bar 508, and a loudspeaker control 509. The start or stop control 507 is used to control the video 502 to be played or stop play back of the video 502. The loudspeaker control 509 is used to choose whether to silently play the video 502. The slidable progress bar 508 is used to display a play back progress of the video 502, and the user may further adjust the playback progress of the video 502 by dragging a circular control on the progress bar leftward or rightward.

The detail interface of the video 502 further includes options such as Share, Favorite, Edit, Delete, and More. If the user taps "Share", the user can share the video 502. If the user taps "Favorite", the user can collect the video 502 in a folder. If the user taps "Edit", the user can edit the video 502. If the user taps "Delete", the user can delete the video 502. If the user taps "More", the user can enter other video operation functions (such as Move, Copy; Add notes, Hide, and Rename).

The detail interface of the video 502 further includes shooting information of the video 502, and the shooting information is usually located above the video 502, as shown in FIG. 6(C) or FIG. 6(D). The shooting information of the video 502 includes a shooting date, shooting time, and a shooting place of the video 502. In addition, the detail interface of the video 502 may further include a circular control, and a letter "i" is filled in the circular control. When the user taps the circular control, the mobile phone can display attribute information of the video 502 in the detail interface of the video 502 in response to the tap operation of the user. For example, the attribute information may include a storage path, resolution, configuration information of the camera at the time of shooting, and the like of the video 502.

The mask shown in FIG. 6(C) is a mask layer. The mask layer is usually a layer mask. The layer mask means that a sheet glass layer covers a layer of an interface displayed on the display screen. In addition, sheet glass layers are classified into a transparent sheet glass layer, a translucent sheet glass layer, and a completely opaque sheet glass layer. A translucent or completely opaque mask can block light of the display screen, so that the interface displayed on the display screen is obscurely visible or completely invisible to the user. The mask shown in FIG. 6(C) may be understood as a translucent sheet glass layer.

The mask guide shown in FIG. 6(C) is displayed for illustration purposes and does not constitute a limitation on a mask guide in a detail interface that is of a video shot by using Magic Take and that is displayed for the first time. In some embodiments, the mask guide may be alternatively set to a guide including a mask and another special effect, for example, a guide including a mask and bubbles.

In addition, the user may control, by inputting an operation in any region of the detail interface that is of the video 502 and that is shown in FIG. 6(C), the mask to disappear. Certainly, for the mobile phone, the mask may be alternatively configured to automatically disappear after being displayed for specific duration, for example, 3 seconds. After the mask and the reminder dialog box in the detail interface that is of the video 502 and that is shown in FIG. 6(C) disappear, the detail interface of the video 502 is shown in FIG. 6(D).

It should be noted that, before the mask in the detail interface that is of the video 502 and that is shown in FIG. 6(C) disappears, the video 502 is in a still state and is not played. After the mask disappears, the video 502 may be automatically played. Usually, the video 502 may be further silently played. Certainly, the user may control, by tapping the loudspeaker control 509 shown in FIG. 6(D), the mobile phone to play the video 502 with a sound.

The user may further perform a leftward or rightward sliding operation or a tap operation in the thumbnail region 504 that is of the highlight images in the video 502 and that is shown in FIG. 6(D). In some embodiments, the user taps a thumbnail of one highlight image in the thumbnail region 504, and in response to the tap operation of the user, the mobile phone displays, on the display screen, the highlight image tapped by the user, to replace the video 502 shown in FIG. 6(D). In another embodiment, the user performs a leftward or rightward sliding operation in the thumbnail region 504, and in response to the sliding operation of the user, the mobile phone may also display a highlight image in the thumbnail region 504 on the display screen by following a sliding direction of the user. The images corresponding to thumbnails that are of the highlight images and that are displayed in the thumbnail region 504 are not saved in the gallery, but are saved in a Magic Take album. That is, in the interface shown in FIG. 6(B), there are no thumbnails corresponding to the highlight images. However, when the user taps the thumbnail of the video 502 to enter the detail interface of the video 502, the thumbnails of the highlight images associated with the video 502 can be displayed in a lower part of the detail interface of the video 502.

The user may further input a leftward or rightward sliding operation in the video 502 shown in FIG. 6(D), and in response to the sliding operation of the user, the mobile phone displays, on the display screen, another image or video saved in the gallery of the mobile phone. In some embodiments, the user inputs a rightward sliding operation in the video 502 shown in FIG. 6(D), and the mobile phone displays, on the display screen, a next video or image that is of the video 502 and that is saved in the gallery. The user inputs a leftward sliding operation in the video 502 shown in FIG. 6(D), and the mobile phone displays, on the display screen, a previous video or image that is of the video 502 and that is saved in the gallery. The previous video or image is a video or an image whose shooting time is earlier than shooting time of the video 502 and closest to the shooting time of the video 502, and the next video or image is a video or an image whose shooting time is later than the shooting time of the video 502 and closest to the shooting time of the video 502.

It should be noted that if the video 502 shot by the user is a video of the foregoing first application scenario, a detail interface of the video 502 is different from that in FIG. 6(C) or that in FIG. 6(D), and the difference lies in that the detail interface of the video 502 does not include the control 505. If the video 502 shot by the user is a video of the foregoing second application scenario, a detail interface of the video 502 is also different from that in FIG. 6(C) or that in FIG. 6(D), and the difference lies in that the detail interface of the video 502 does not include the thumbnail region 504.

It should be further noted that, when the user shoots a video in the Magic Take mode of the mobile phone, in addition to obtaining the shot video and one or more highlight images in the video, the mobile phone may further generate a configuration file. The configuration file may include tags (TAG) of the video. Alternatively, the mobile phone may obtain tag data. The tag data includes tags (TAG) of the video. In addition, the tag data may be added to the video, and is usually located in a video header.

The following content is described by using an example in which the mobile phone obtains a video and a configuration file of the video. Certainly, in a solution in which tags of the video are stored in the video in a form of tag data, in the following content, obtaining a configuration file of the video may be changed to obtaining the tag data of the video.

In a possible implementation, the tags (TAG) of the video may be set based on level information of the video. The level information of the video may include first level information LV0, second level information LV1, third level information LV2, and fourth level information LV3.

The first level information LV0 is used to represent a theme category of the video, and is used to give a style TAG or an atmosphere TAG of the entire video.

The second level information LV1 is used to represent a scene of the video, and is used to give a scene TAG of the video.

The third level information LV2 is used to represent a scene change of the video, and the scene change may also be understood as a transition storyboard change. The third level information LV2 may give a video transition position (for example, a number of a frame at which transition occurs) and a transition type (an image content change caused by character protagonist switching, fast moving shot, a scene category change, or another case), to avoid excessive recommended similar scenes. The information LV2 is used to represent the video scene change (which may also be referred to as transition), including but not limited to one or more of the following changes: a character subject (or protagonist) change, a great image content composition change, a semantic scene change, and an image brightness or color change. When a scene change is caused in the video, the mobile phone may add a storyboard TAG to the video by using the third level information LV2.

The fourth level information LV3 is used to represent a magic moment, namely, a shooting moment of a highlight image, and is used to give a highlight image TAG of the video.

The first level information LV0, the second level information LV1, the third level information LV2, and the fourth level information LV3 provide decision information in a coarse-to-fine granularity order, to identify the highlight image in the video and generate a selected video.

The following Table 1 gives examples of definitions of LV0 and LV1.

TABLE 1

| Theme category (LV0) | Scene category (LV1) |
|---|---|
| Character | Character or the like |
| Gourmet food | Gourmet food or the like |
| Ancient architecture | Ancient architecture or the like |
| Night scenery | Fireworks or another night scenery |
| Nature | Snow scenery, plant, mountain, river, or the like |
| Chinese and Western festivals | Chinese and Western festivals or the like |
| Wedding | Wedding or the like |
| Graduation | Graduation or the like |
| Birthday | Birthday or the like |
| Sports | Character, sports action, or the like |
| Childishness | Child, cat, dog, or the like |
| Party | Character or the like |
| Leisure | Character or the like |
| Travel | Beach, airplane, ancient architecture, character, mountain, or the like |
| Joyful/sentimental/ dynamic rhythm | Joyful, sentimental, dynamic rhythm, leisure, or the like |

The mobile phone may generate a selected video of a shot video by using the shot video and a configuration file of the shot video. Certainly, when the mobile phone can identify a highlight image from the shot video, the selected video includes the highlight image in the shot video and includes some special effects and music. In addition, when the mobile phone cannot identify a highlight image from the shot video, but can identify an image of good quality, the mobile phone generates the selected video by using the image of good quality. Certainly, the selected video also includes some special effects and music. It should be further noted that the configuration file or tag data of the video also includes a TAG of the image of good quality.

The image of good quality in this application means that the image is relatively clear, for example, has relatively high resolution; or the image is relatively complete.

The special effect in this application means that the special effect can be supported by a material, and can present a special effect after being added to a video frame, for example, an animation effect such as snowflakes or fireworks, a filter, a sticker, or a border. In some embodiments, the special effect may also be referred to as a style, a style theme, or the like.

The following content of this application is described by using an example in which the mobile phone generates a selected video by using a highlight image.

Figure 7A:
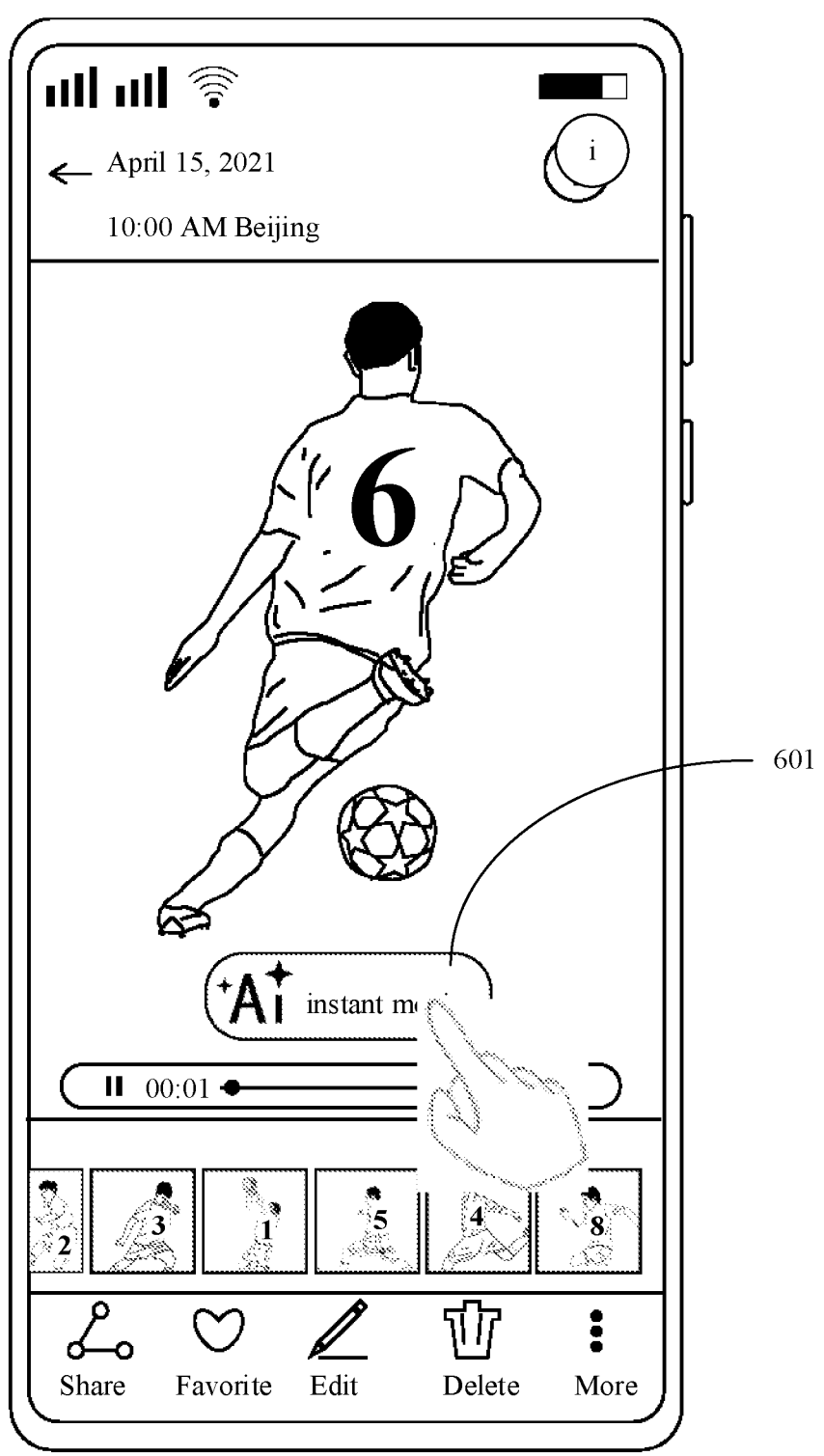
FIG. 7(A), FIG. 7(B), and FIG. 7(C) are schematic diagrams of another example of a graphical user interface of "Magic Take" according to Embodiment 1 of this application.

For example, as shown in FIG. 7(A), the user taps a control 601 in a detail interface of a video. In response to the tap operation of the user, the mobile phone generates a selected video with specific duration.

Figure 7B:

Usually, because specific time needs to be consumed to generate the selected video of the video, after the user taps the control 601 in the detail interface of the video, as shown in FIG. 7(A), the display screen of the mobile phone displays a buffer interface that is of a selected video 602 and that is shown in FIG. 7(B). After the selected video 602 is generated, the display screen of the mobile phone displays a display interface of the selected video 602. Certainly, when performance of the mobile phone is relatively high, after the user taps the control 601 in the detail interface of the video, as shown in FIG. 7(A), the display screen of the mobile phone may directly display the display interface of the selected video 602 without displaying the buffer interface in FIG. 7(B).

Figure 7C:

For example, the selected video 602 is being played in the display interface of the selected video 602. In addition, as shown in FIG. 7(C), the display interface of the selected video 602 includes a style control 603, a save control 604, a share control 605, a music control 606, an edit control 607, and the like.

The user taps the style control 603, and in response to the tap operation of the user, the mobile phone displays, on the display screen, a plurality of video styles saved by the mobile phone. The user may select different video styles for the selected video 602. In some embodiments, the video style may be a filter, that is, the selected video 602 is tinted by applying a filter. The filter is one of video special effects, and is used to implement various special effects of the selected video 602. In some other embodiments, the video style may be alternatively a video effect such as fast playback or slow playback. In some other embodiments, the video style may be alternatively various themes, and different themes include respective corresponding content such as filters and music.

The user taps the share control 605, and the mobile phone can share the selected video 602 in response to the tap operation of the user.

The user taps the music control 606, and in response to the tap operation of the user, the mobile phone displays, on the display screen, an interface for adding different soundtracks to the highlight video 602. The interface displays a plurality of soundtrack controls, and the user may tap any soundtrack control to add a soundtrack, for example, a soothing, romantic, warm, cozy, or tranquil soundtrack, to the selected video 602.

The user taps the edit control 607, and the mobile phone displays a clipping interface of the highlight video 602 in response to the tap operation of the user. The user can input an edit operation such as clipping, segmentation, volume adjustment, or frame size adjustment on the highlight video 602 in the edit interface.

The save control 604 is used to save the selected video 602.

Figure 9:
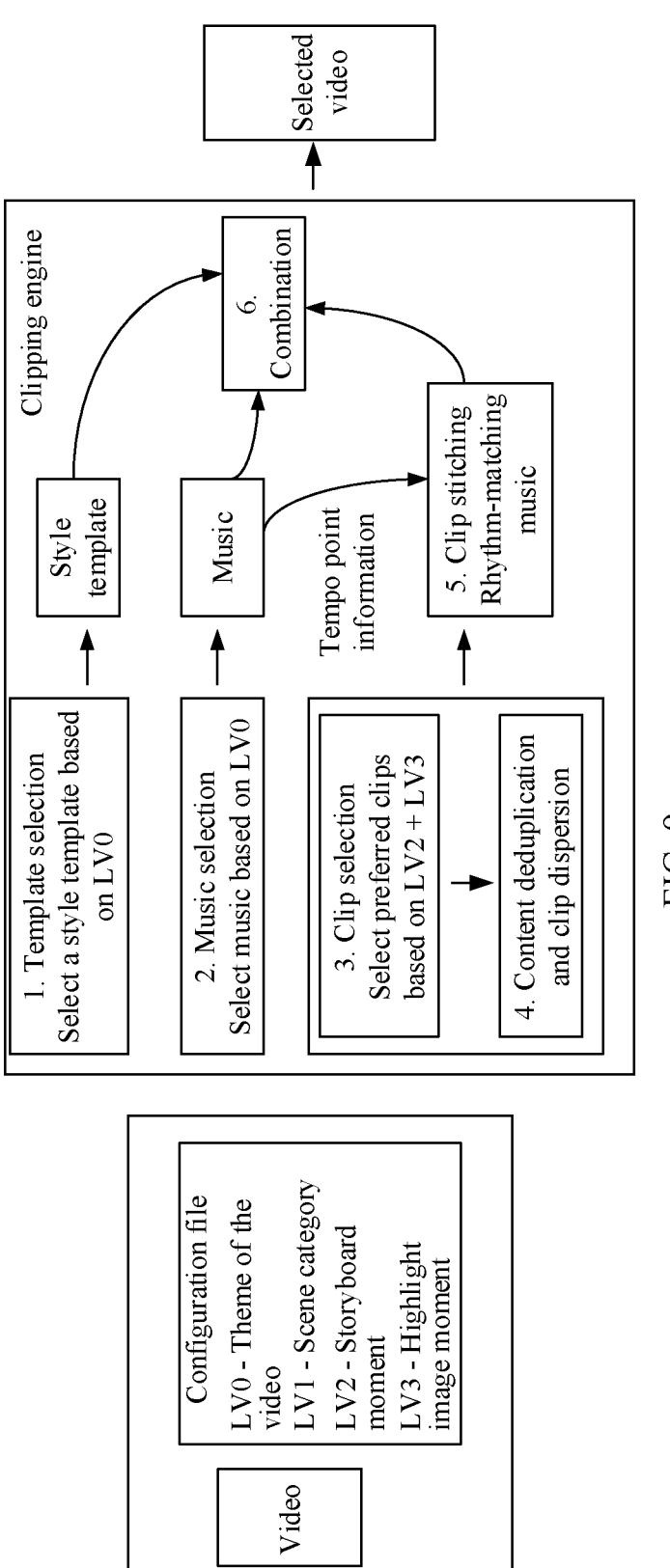
FIG. 9 is a display diagram of generating a selected video according to Embodiment 1 of this application.
Figure 10:
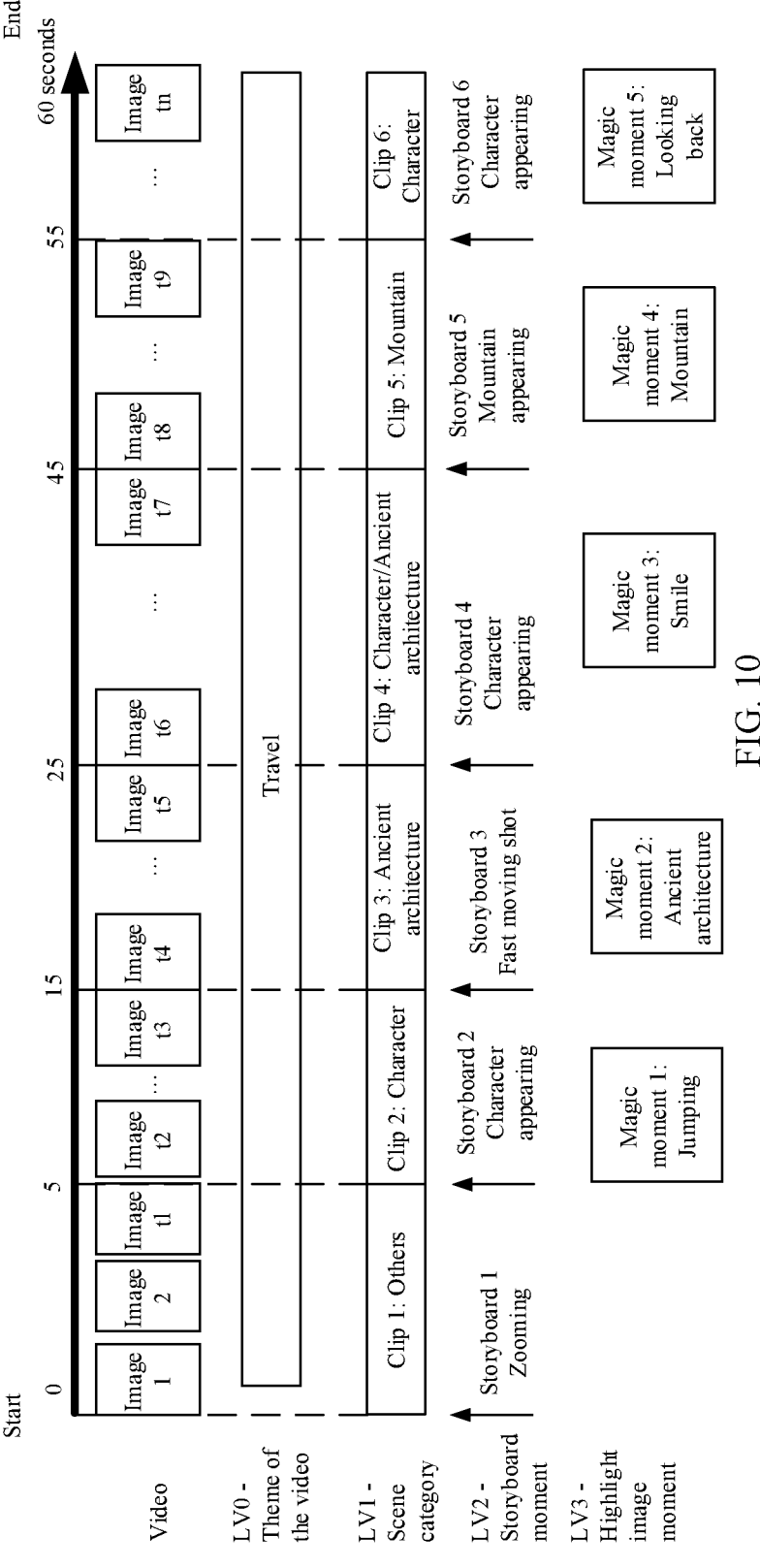
FIG. 10 is a display diagram of an example of generating a selected video according to Embodiment 1 of this application.

The following describes, with reference to FIG. 8, FIG. 9, and FIG. 10, a process of generating the selected video 602.

Referring to FIG. 8, a method for generating a selected video by a mobile phone according to an embodiment of this application includes the following steps:

S701: Obtain a video and a configuration file of the video in response to a first operation of a user, where the configuration file of the video includes a theme TAG, a scene TAG, story board TAGs, and highlight image TAGs.

It may be learned from the foregoing content that, when the mobile phone shoots a video in a "Magic Take" mode, the mobile phone identifies content of the shot video, and determines level information of the video. The mobile phone may further set a theme TAG, a scene TAG, a story board TAG, and a highlight image TAG for the video by using the level information of the video, and write the theme TAG, the scene TAG, the story board TAG, and the highlight image TAG into a configuration file of the video. After shooting of the video ends, the mobile phone can save the shot video and the configuration file of the video.

In the configuration file of the video, the theme TAG is used to represent a style or an atmosphere of the video. In an example shown in FIG. 10, a 60-second video shot by the mobile phone includes tn frames of images, where tn is an integer. In a process in which the mobile phone shoots the video, the mobile phone may constantly identify a style or an atmosphere of the video, to determine a theme of the video. In some embodiments, the mobile phone may invoke an identification algorithm to identify images in the video, to determine the style or the atmosphere of the video. Certainly, the mobile phone may alternatively identify, after shooting of the video is completed, the images in the video by using the identification algorithm, to determine the style or the atmosphere of the video.

In the example shown in FIG. 10, the mobile phone invokes the identification algorithm to identify the images in the video, and determines that the video belongs to a travel theme.

The scene TAG is used to represent a scene of the video. In the example shown in FIG. 10, the video is divided into six scenes. The first scene includes a video clip of the zeroth to the fifth seconds, and is an others scene. The second scene includes a video clip of the fifth to the fifteenth seconds, and is a character scene. The third scene includes a video clip of the fifteenth to the twenty-fifth seconds, and is an ancient architecture scene. The fourth scene includes a video clip of the twenty-fifth to the forty-fifth seconds, and is a character and ancient architecture scene. The fifth scene includes a video clip of the forty-fifth to the fifty-fifth seconds, and is a mountain scene. The sixth scene includes a video clip of the fifty-fifth to the sixtieth seconds, and is a character scene.

The story board TAG is used to indicate a scene transition position in the shot video. In the example shown in FIG. 10, the video includes six story board TAGs. The first story board TAG indicates that the first scene starts at the zeroth second. The second story board TAG indicates that the second scene starts at the fifth second. The third story board TAG indicates that the third scene starts at the fifteenth second. The fourth storyboard TAG indicates that the fourth scene starts at the twenty-fifth second. The fifth storyboard TAG indicates that the fifth scene starts at the forty-fifth second. The sixth story board TAG indicates that the sixth scene starts at the fifty-fifth second.

The highlight image TAG is used to represent a position of a highlight image in the shot video. In the example shown in FIG. 10, the video includes five highlight images.

Figure 6A:
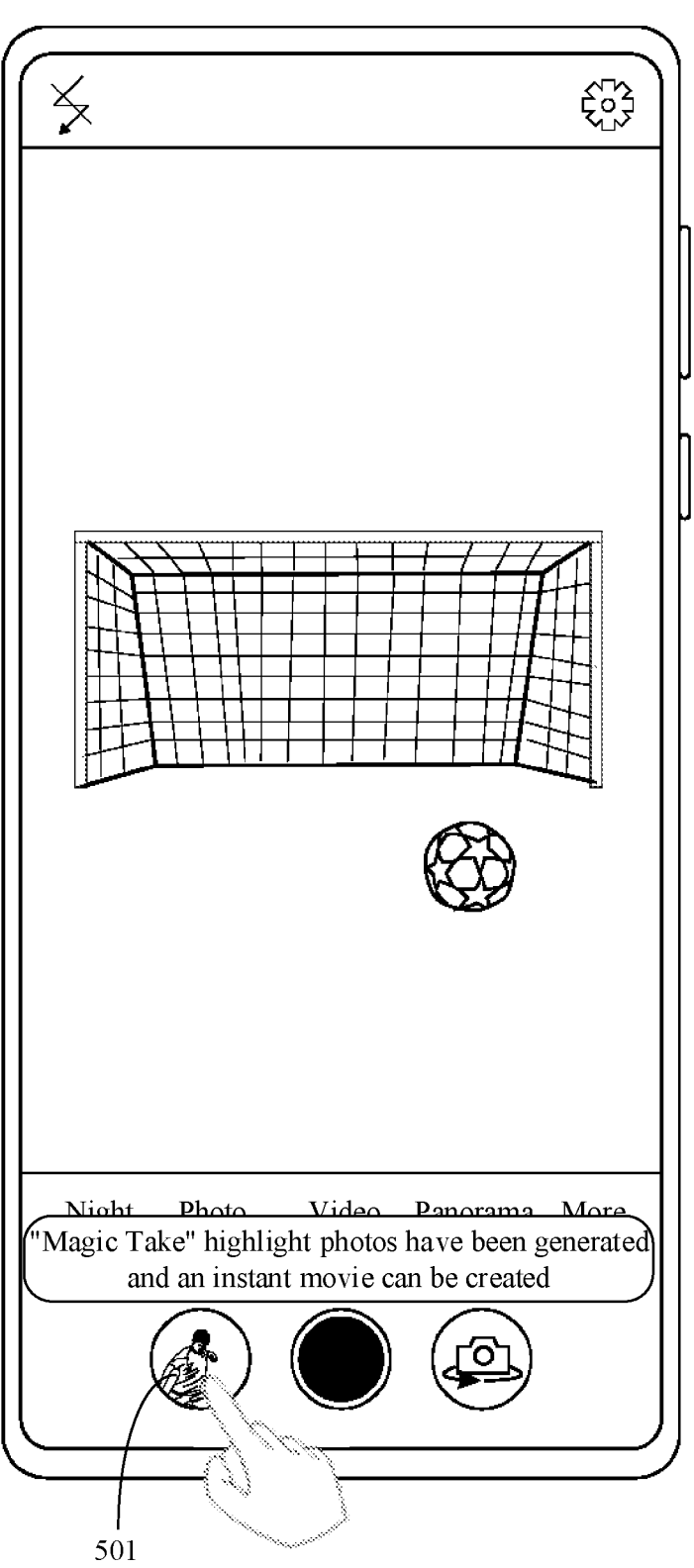
FIG. 6(A), FIG. 6(B), FIG. 6(C), and FIG. 6(D) are schematic diagrams of another example of a graphical user interface of "Magic Take" according to Embodiment 1 of this application.
Figure 6B:
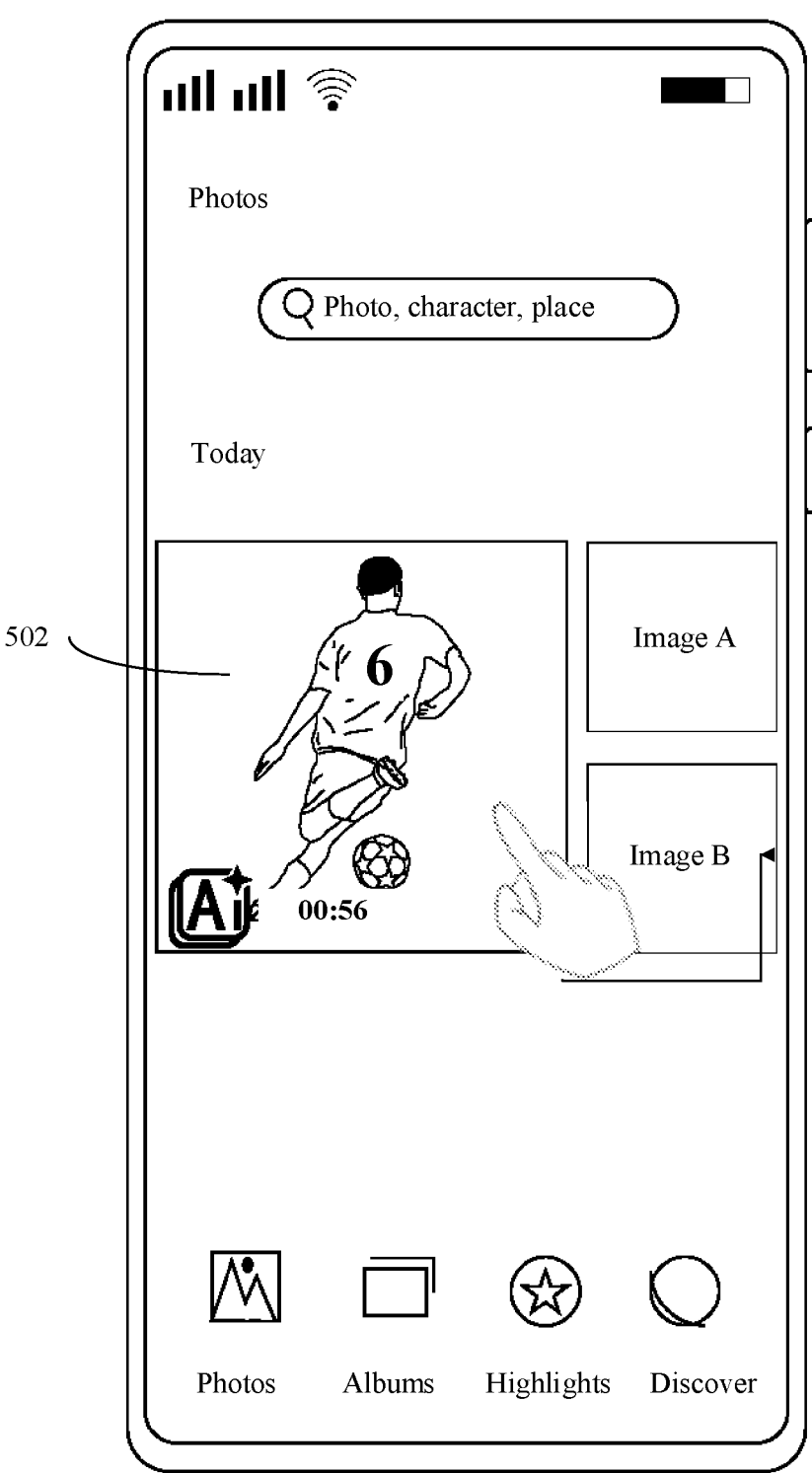
Figure 6C:
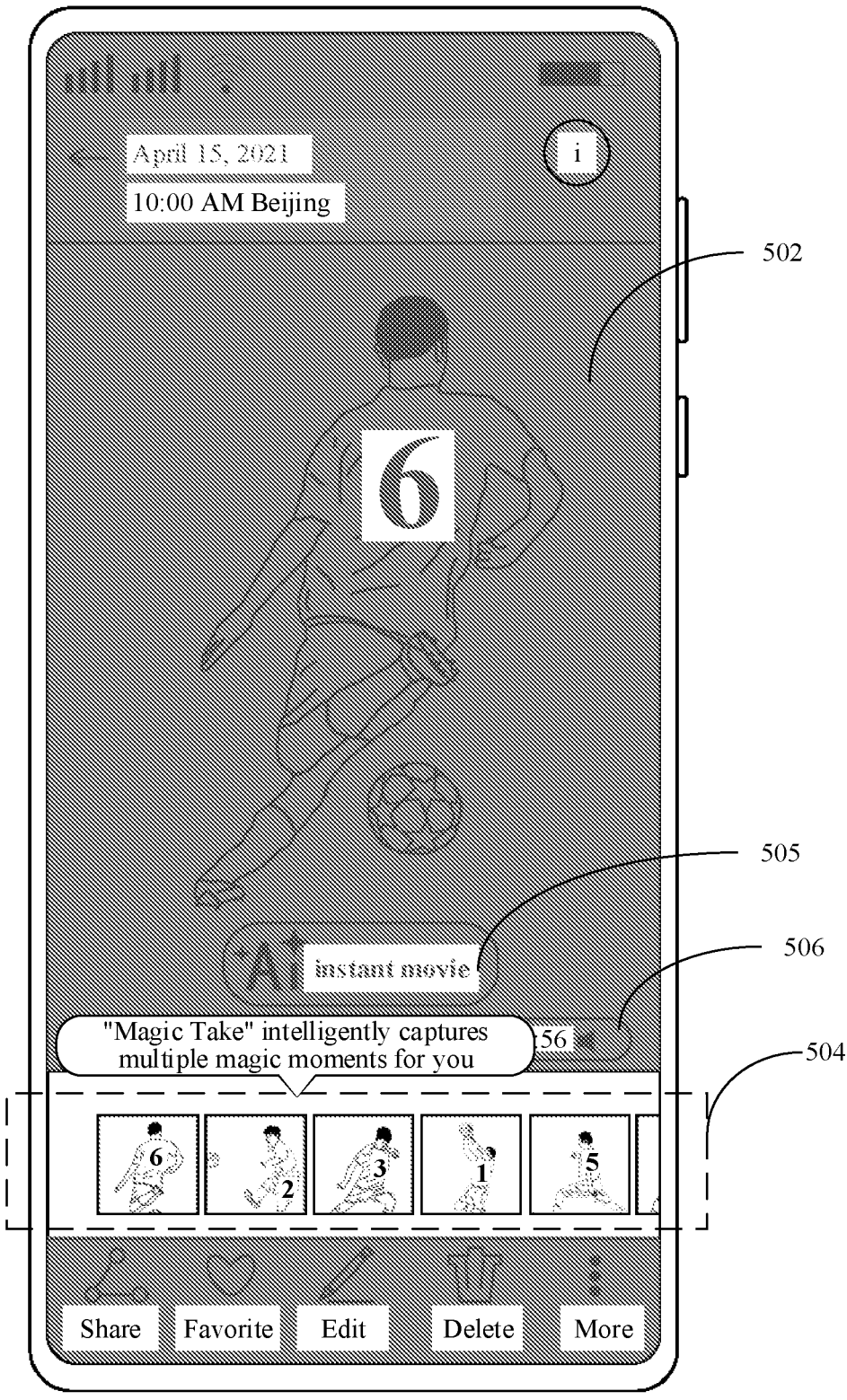
Figure 6D:
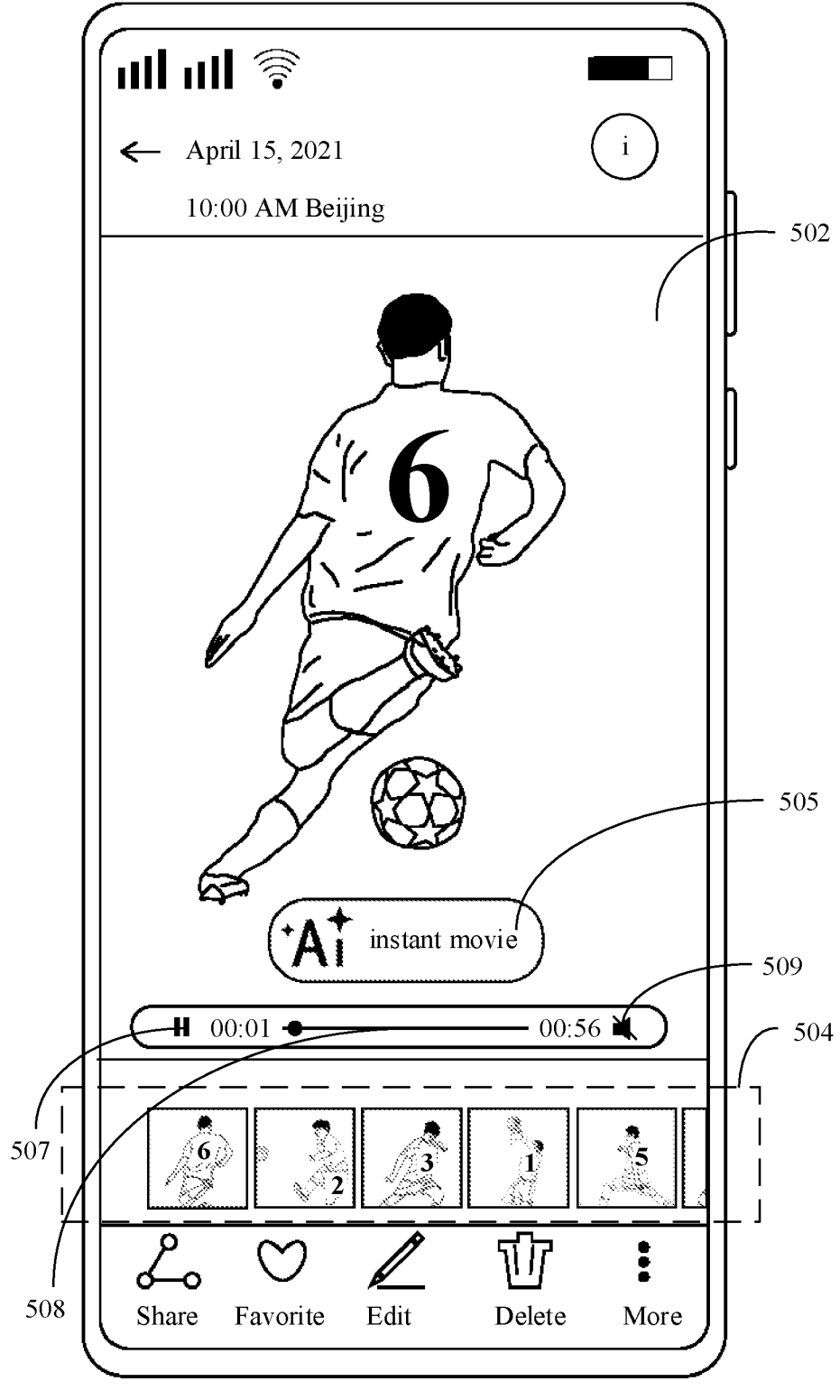

As shown in FIG. 6(A), the user may tap an "Ai instant movie" control to input an indication for generating a selected video to the mobile phone. The mobile phone receives the tap operation (also referred to as the first operation) of the user, and obtains the video saved by the mobile phone and the configuration file of the video in response to the tap operation.

S702: Determine a style template and music based on the theme TAG of the video.

The mobile phone saves a plurality of style templates and music, and the style templates may include a plurality of special effects.

Referring to FIG. 9, a clipping engine is used to determine the style template and the music by using the theme TAG of the video. The style template and the music are used to obtain a selected video of the video through combination. It may be understood that the clipping engine is a service or an application, and may be set in an application layer, an application framework layer, or a system library of a software framework of the mobile phone. The clipping engine is used to generate the selected video of the video.

In some embodiments, the mobile phone saves a correspondence between a theme TAG, a style template, and music, and the mobile phone may determine, based on the theme TAG of the video, a style template and music that correspond to the theme TAG.

In some other embodiments, the mobile phone may alternatively randomly select, based on the theme TAG of the video, a style template and music that are saved by the mobile phone. It should be noted that for a same video, after a selected video of the video is generated, if the user further edits the selected video to adjust a style template or music, the mobile phone selects a different style template or different music, to ensure that a specific effect of a selected video generated by the mobile phone for the same video each time is different.

It should be noted that step S702 may be understood as 1. Template selection and 2. Music selection shown in FIG. 9.

S703: Determine a story board clip in each scene in the video based on the story board TAGs.

The story board TAG of the video can indicate a scene transition position in the shot video. Therefore, the clipping engine can determine, based on the story board TAGs, scenes included in the video. The clipping engine may divide the video into a plurality of story board clips based on the scenes by using the story board TAGs. Certainly, instead of actually dividing the video into story board clips, the clipping engine marks the story board clip in each scene in the video by marking the video based on the story board TAGs.

In the example shown in FIG. 10, the video includes six story board TAGs, and based on the six story board TAGs, story board clips in the video include a story board clip in the first scene of the zeroth to the fifth seconds, a story board clip in the second scene of the fifth to the fifteenth seconds, the story board clip of the third scene of the fifteenth to the twenty-fifth seconds, a story board clip in the fourth scene of the twenty-fifth to the forty-fifth seconds, a story board clip in the fifth scene of the forty-fifth to the fifty-fifth seconds, and a story board clip of the sixth scene of the fifty-fifth to the sixtieth seconds.

S704: Determine positions of highlight images in the story board clips based on the highlight image TAGs.

The highlight image TAGs are used to indicate positions of the highlight images in the shot video. Therefore, the positions of the highlight images in the story board clips can be determined based on the highlight image TAGs. In some embodiments, a story board clip in one scene may include one or more highlight images.

In the example shown in FIG. 10, the video shot by the mobile phone includes five highlight images. The first highlight image belongs to the story board clip in the second scene, the second highlight image belongs to the story board clip in the third scene, the third highlight image belongs to the storyboard clip in the fourth scene, the fourth highlight image belongs to the story board clip in the fifth scene, and the fifth highlight image belongs to the story board clip in the sixth scene.

S705: Obtain a plurality of previous and following frames of images of the highlight images from the story board clips of the video, to obtain associated images of the highlight images.

In some embodiments, a story board clip in one scene of the video includes at least one highlight image. Therefore, in a story board clip in a scene to which a highlight image belongs, the clipping engine obtains several previous frames of images and several following frames of images of the highlight image. For example, five previous frames of images and five following frames of images of the highlight image may be obtained. The clipping engine uses the obtained images as associated images of the highlight image.

In the example shown in FIG. 10, five previous frames of images and five following frames of images of the first highlight image are obtained from the story board clip in the second scene, five previous frames of images and five following frames of images of the second highlight image are obtained from the story board clip in the third scene, five previous frames of images and five following frames of images of the third highlight image are obtained from the story board clip in the fourth scene, five previous frames of images and five following frames of images of the fourth highlight image are obtained from the story board clip in the fifth scene, and five previous frames of images and five following frames of images of the fifth highlight image are obtained from the story board clip in the sixth scene.

In addition, when a quantity of highlight images in the video shot by the mobile phone exceeds a limit of a quantity of highlight images that can be finally presented, highlight images with larger highlight degree score values may be preferentially retained and highlight images with smaller highlight degree score values may be discarded, and then step S705 may be performed.

It should be noted that step S703 and step S705 may be understood as 3. Clip selection shown in FIG. 9.

It may be understood that one highlight image and associated images of the highlight image are combined to form a small clip. After a small clip obtained by combining each highlight image and associated images of the highlight image is obtained, as shown in FIG. 8, 8. Content deduplication and clip dispersion may be further performed.

The content deduplication may be understood as retaining only one small clip for same content by deleting a small clip of the same content from small clips obtained by combining the highlight images and the associated images of the highlight images.

The clip dispersion may be understood as dispersing images included in a small clip. In some embodiments, a transition image may be inserted between images included in the small clip. Content of the inserted transition image may be substantially the same as content of the images in the small clip, and follows a transition change from several previous frames of images of a highlight image to the highlight image and then to several following frames of images of the highlight image.

S706: Stitch the highlight images and the associated images of the highlight images in a time sequence, to obtain a video clip.

In some embodiments, as described in the content of step S705, each highlight image and associated images of the highlight image may be combined to form a small clip, and in the small clip, the highlight image and the associated images of the highlight image are arranged in a photographing time sequence. In addition, small clips are also stitched in a shooting time sequence, to obtain the video clip.

In some other embodiments, alternatively, all the highlight images and the associated images of all the highlight images may be stitched in a photographing time sequence, to obtain the video clip.

In the example shown in FIG. 10, stitching is performed in an order of the five previous images of the first highlight image, the first highlight image, the five following images of the first highlight image, the five previous images of the second highlight image, the second highlight image, the five following images of the second highlight image, . . . , the five previous images of the fifth highlight image, the fifth highlight image, and the five following images of the fifth highlight image, to obtain a video clip.

It should be noted that step S706 may be understood as 5. Clip stitching policy shown in FIG. 9.

Still referring to FIG. 9, when the video clip is obtained after stitching, reference may be made to tempo point information of the music determined in step S702, to ensure that the video clip obtained after stitching matches tempo points of the music.

S707: Combine a special effect provided by the style template, the music, and the video clip to obtain a selected video.

It should be noted that step S707 may be understood as 6. Combination shown in FIG. 8. A video obtained after combination is the selected video.

In addition, if the mobile phone generates a selected video by using images of good quality, in the above-described method for generating a selected video by a mobile phone, it is only necessary to replace the highlight images with the images of good quality. To avoid repetition, a method for generating a selected video by using images of good quality is not described herein in detail.

After the selected video is generated by using the foregoing content, the selected video may be saved.

The following describes, with reference to FIG. 11, a process of saving the selected video.

Figure 11A:
FIG. 11(A), FIG. 11(B), and FIG. 11(C) are schematic diagrams of another example of a graphical user interface of "Magic Take" according to Embodiment 1 of this application.
Figure 11B:
Figure 11C:
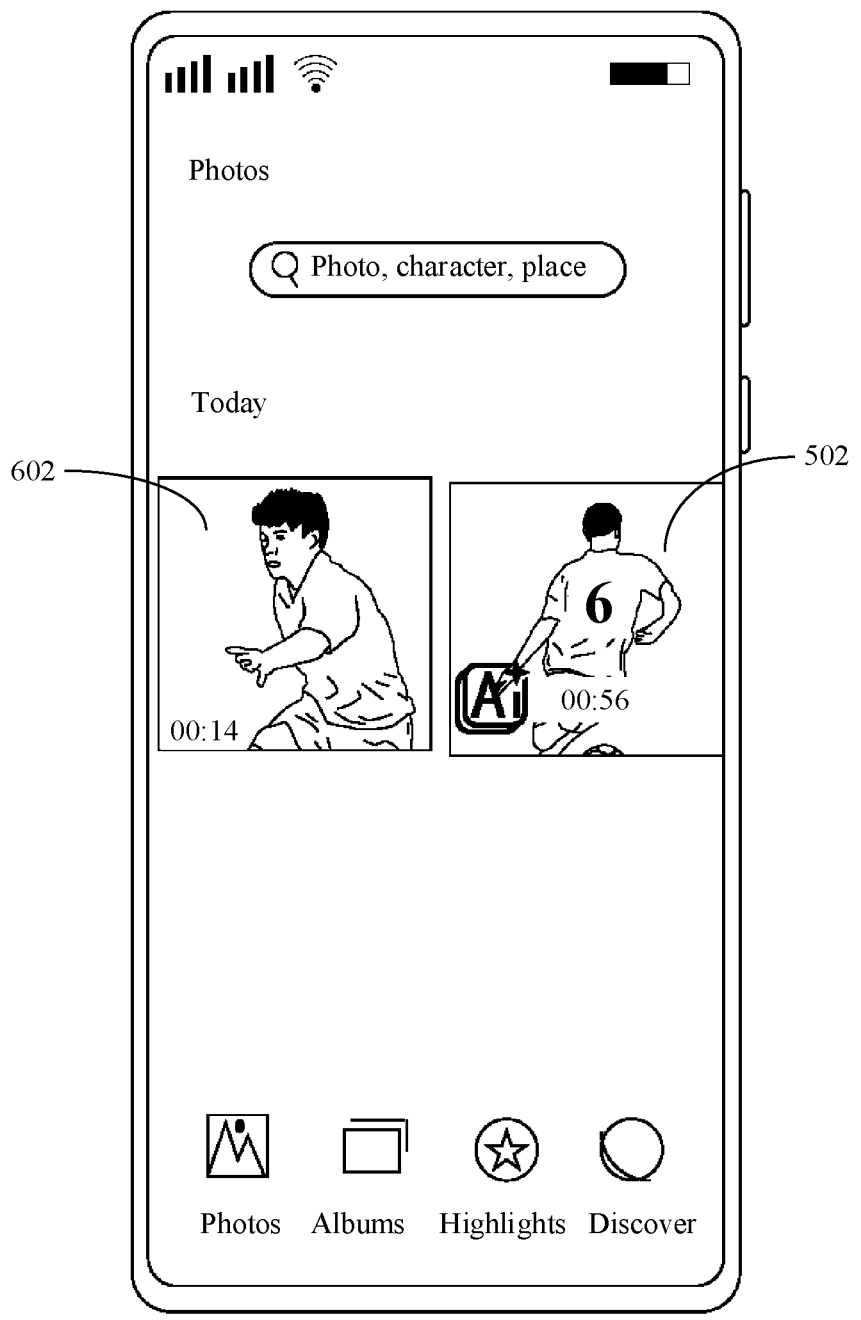

For example, the user taps the save control 604 in the display interface that is of the selected video 602 and that is shown in FIG. 11(A). The mobile phone saves the selected video 602 in response to the tap operation of the user. For example, as shown in FIG. 11(C), the mobile phone saves the selected video 602 in the gallery. In some embodiments, the selected video 602 may be saved by following the original video 502 of the selected video 602, that is, the selected video 602 and the original video 502 are saved in a same storage region. In some other embodiments, the selected video 602 may not be saved by following the original video 502 of the selected video 602, that is, the selected video 602 and the original video 502 are saved in different storage regions. It should be noted that the original video 502 is a video shot by the user, and the selected video 602 is from the original video 502.

The user taps the save control 604 in the display interface that is of the selected video 602 and that is shown in FIG. 11(A). The mobile phone saves the selected video 602 in response to the tap operation of the user. In addition, the display screen of the mobile phone may further display a detail interface of the selected video 602. For example, the detail interface of the selected video 602 is shown in FIG. 11(B). In some embodiments, the selected video 602 may be automatically played in the detail interface of the selected video 602.

The detail interface of the selected video 602 is substantially the same as the detail interface that is of the video 502 and that is shown in FIG. 6(D), and a difference lies in that the selected video 602 is played in the detail interface of the selected video 602. For controls included in the detail interface of the selected video 602 and functions of the controls, refer to the content of the detail interface that is of the video 502 and that is shown in FIG. 6(D) in the foregoing content. Details are not described herein again.

It should be noted that, before the user taps the save control 604 shown in FIG. 11(A), the mobile phone may generate the selected video 602, but does not save the selected video 602 in an internal memory: The mobile phone saves the generated selected video 602 in the internal memory only after the user taps the save control 604 shown in FIG. 11(A).

Embodiment 2

As described in Embodiment 1, in a process of shooting a video in a Magic Take mode, a mobile phone can obtain highlight images in the video. After completing shooting of the video, the mobile phone can obtain the shot video and one or more highlight images in the video. In this way, a memorable magic moment photo can be captured while a video is shot.

However, if a user does not learn that a Magic Take mode is set in a mobile phone and therefore the mobile phone can support a function of capturing a memorable magic moment photo while shooting a video, when shooting a video, the user still further controls the mobile phone to shoot an image in a shooting mode. Based on this, when detecting the behavior of the user, the mobile phone needs to guide the user in learning of a Magic Take function of the mobile phone.

Figure 12A:
FIG. 12(A), FIG. 12(B), FIG. 12(C), and FIG. 12(D) are schematic diagrams of an example of a graphical user interface of "Magic Take" according to Embodiment 2 of this application.
Figure 12B:
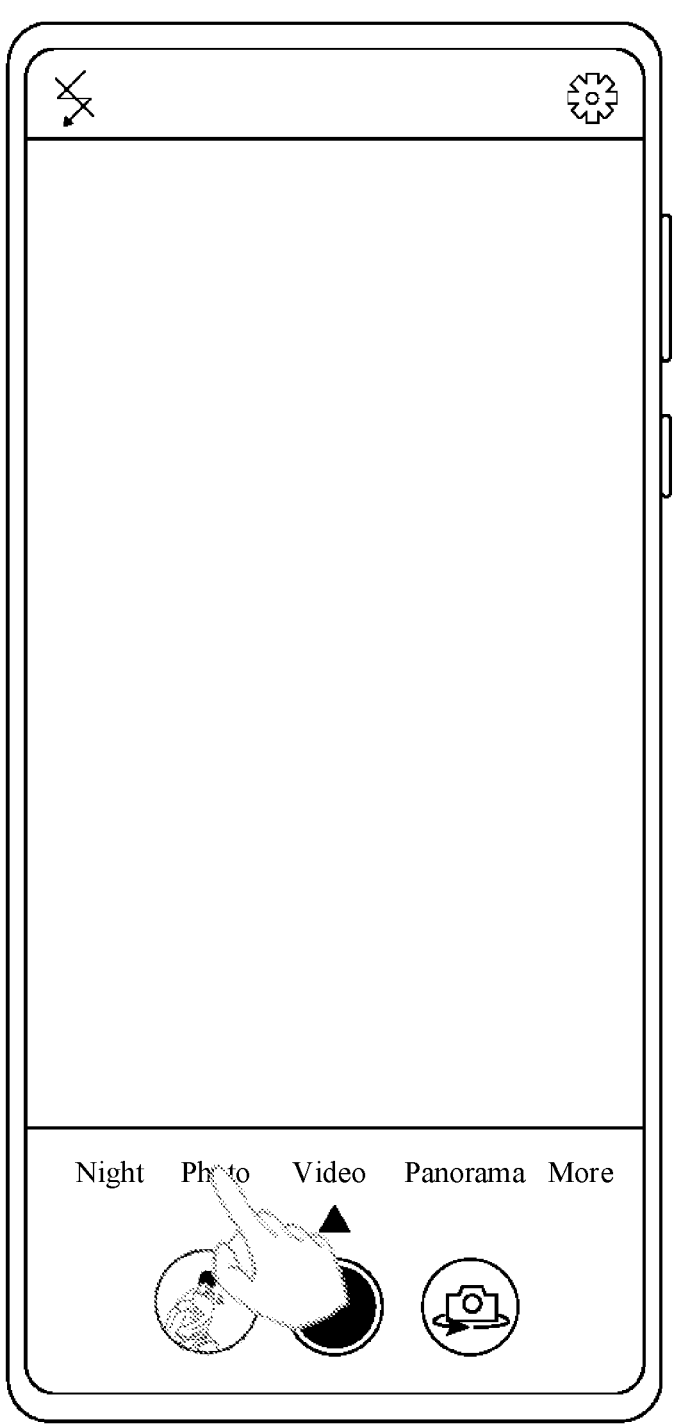

For example, a video shooting interface of the mobile phone is shown in FIG. 12(A). The user wants to shoot an image in a process of shooting a video by using the mobile phone. The user may tap a stop control 1101 in the video shooting interface to stop shooting. In response to the tap operation of the user, the mobile phone saves the shot video, and displays a shooting interface that is shown in FIG. 12(B) and in which the mobile phone is in a video mode. The user taps "Photo" shown in FIG. 12(B), and in response to the tap operation of the user, the mobile phone enters a shooting interface that is of a shooting mode and that is shown in FIG. 12(C).

Figure 12C:
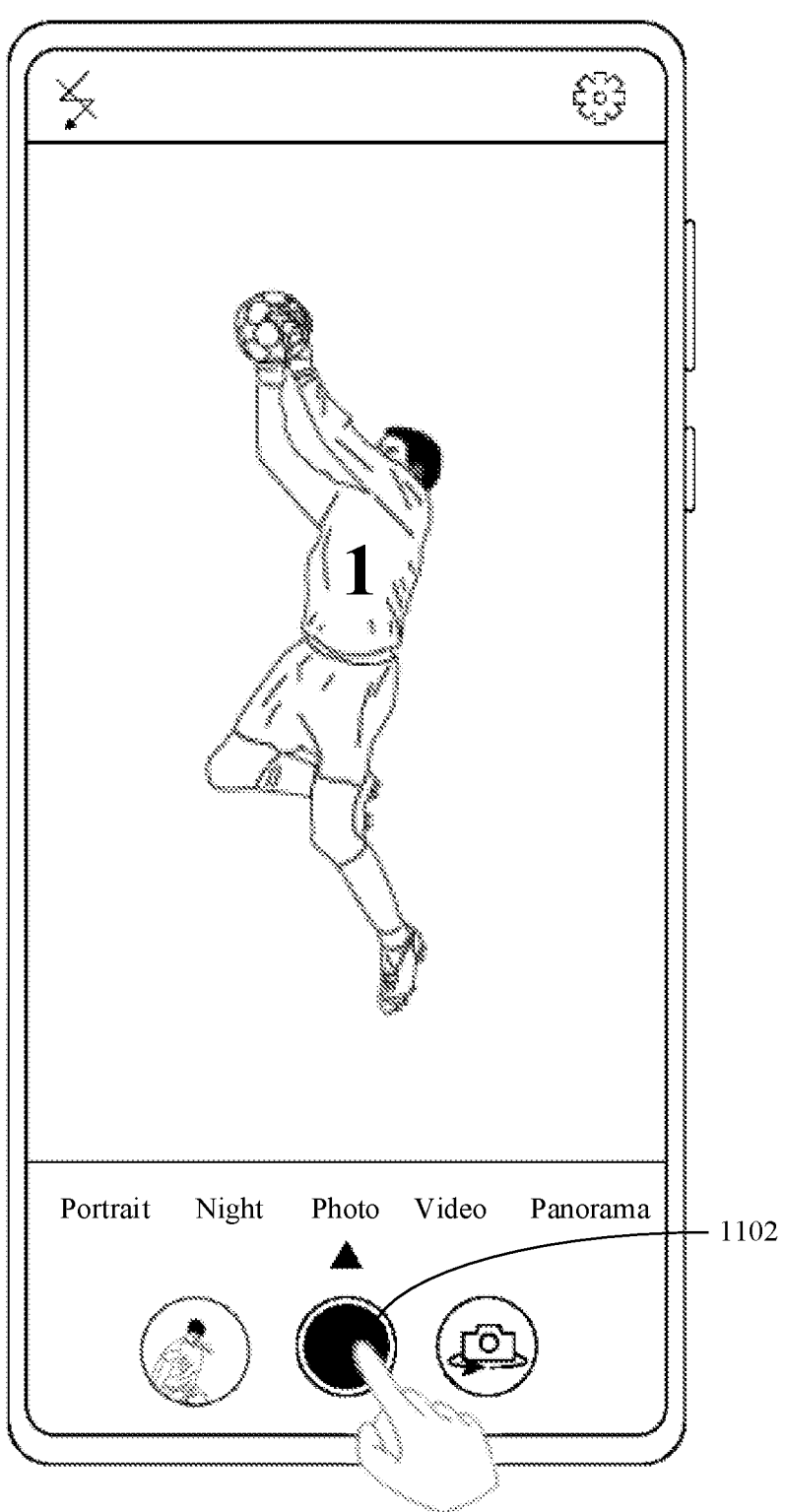

The user taps, in the shooting interface shown in FIG. 12(C), a control 1102 for controlling shooting. In response to the tap operation of the user, the mobile phone shoots an image, and saves the shot image. Then, the user controls the mobile phone to shoot a video.

Figure 12D:
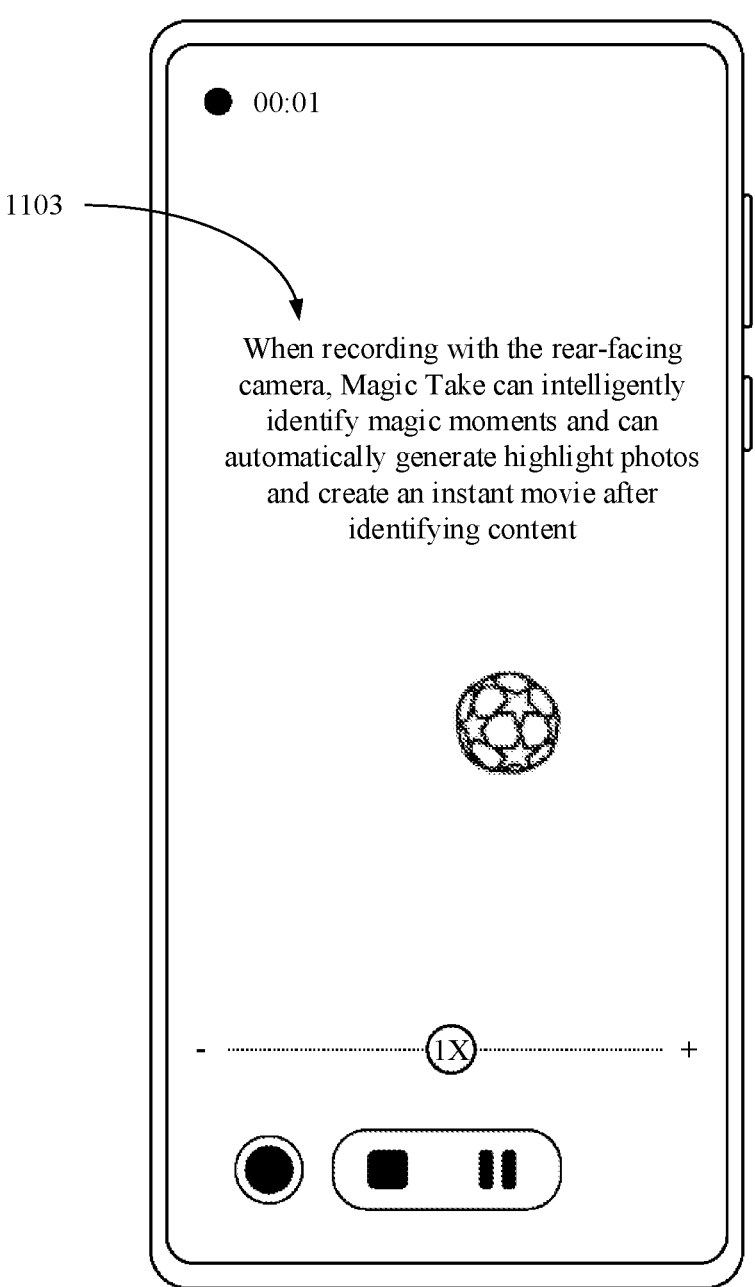

When detecting the foregoing operations of the user, the mobile phone may display a guide prompt of "Magic Take" on a video shooting interface when the user controls the mobile phone to shoot a video. For example, a video shooting interface that is of the mobile phone and that is shown in FIG. 12(D) displays a dialog box 1103 of a guide prompt of "Magic Take". The dialog box 1103 includes a text "When recording with the rear-facing camera, Magic Take can intelligently identify magic moments and can automatically generate highlight photos and create an instant movie after identifying content". The user may be further prompted that the user can also manually tap, in a process of shooting a video, a control to capture a photo.

To implement the foregoing function, in a video processing method provided in this embodiment, in a process in which the mobile phone determines to shoot a video in the Magic Take mode, the mobile phone may detect whether the user performs operations including ending shooting of a video, immediately performing photographing, and shooting a video again after ending photographing. If the mobile phone detects that the user performs operations including ending shooting of a video, immediately performing photographing, and shooting a video again after ending photographing, when the user shoots the video again after ending photographing, the mobile phone displays a guide prompt of "Magic Take" on a video shooting interface displayed on a display screen of the mobile phone.

Certainly, in a process in which the mobile phone shoots a video in the Magic Take mode, if the mobile phone does not detect that the user performs operations including ending shooting of a video, immediately performing photographing, and shooting a video again after ending photographing, the mobile phone can respond to an operation of the user according to a conventional procedure.

The mobile phone may detect, in the following manner, whether the user performs operations including ending shooting of a video, immediately performing photographing, and shooting a video again after ending photographing:

The mobile phone traverses processes of the mobile phone, identifies status changes of the processes of the mobile phone, and determines, by using status change results of the processes of the mobile phone, whether the user performs operations including ending shooting of a video, immediately performing photographing, and shooting a video again after ending photographing.

If the mobile phone determines that a video process is in a running state, and further determines that a photo process is enabled to be in a running state during specific duration, for example, 10 seconds, in which the video process is disabled, and the video process is enabled to be in the running state during specific duration, for example, 10 seconds, in which the photo process is disabled, it indicates that the user performs operations including ending shooting of a video, immediately performing photographing, and shooting a video again after ending photographing.

In some embodiments, the mobile phone may distinguish between different mobile phone processes by using process identifiers. The video process has a video process identifier, and the photo process has a photo process identifier.

Embodiment 3

In a process of shooting a video in a Magic Take mode, a mobile phone further supports a manual capture function.

Figure 13A:
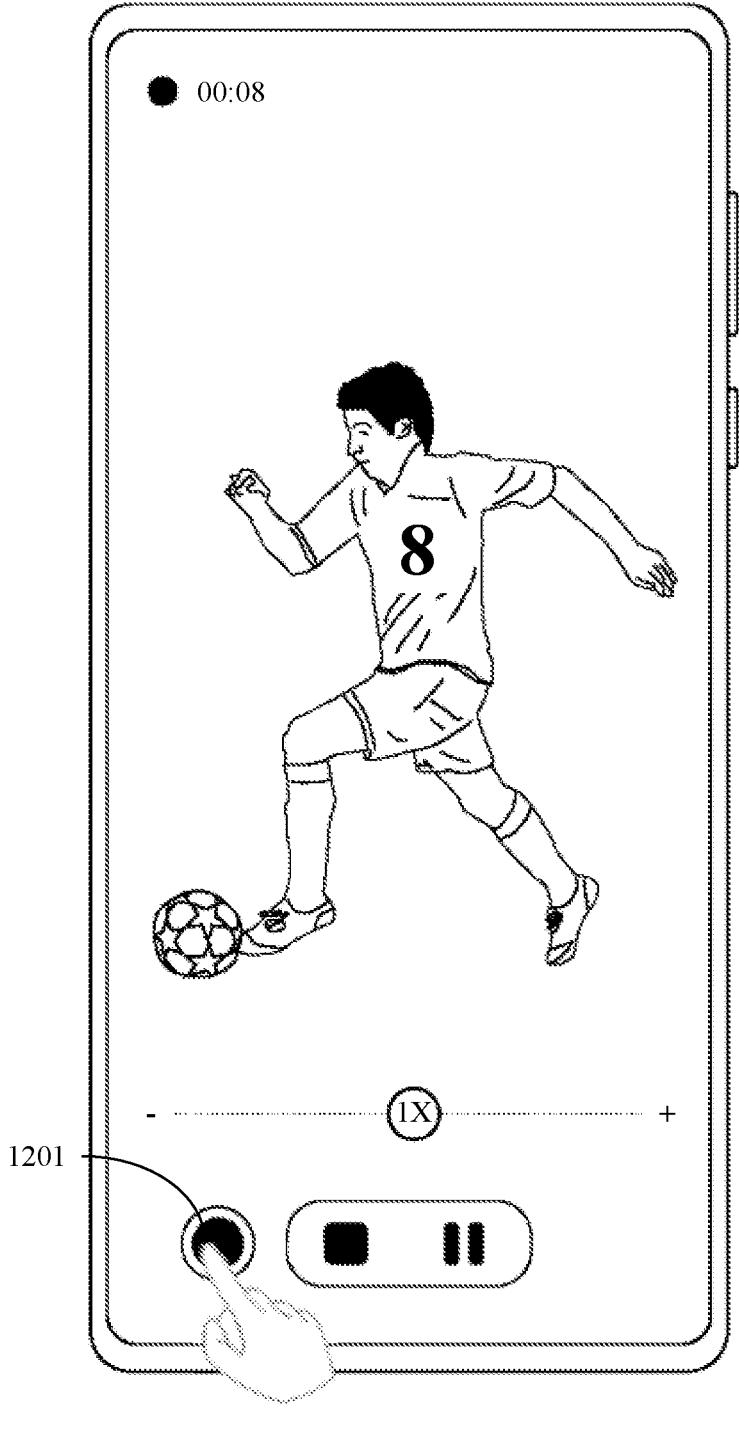
FIG. 13(A), FIG. 13(B), FIG. 13(C), FIG. 13(D), and FIG. 13(E) are schematic diagrams of an example of a graphical user interface of "Magic Take" according to Embodiment 3 of this application.
Figure 13B:
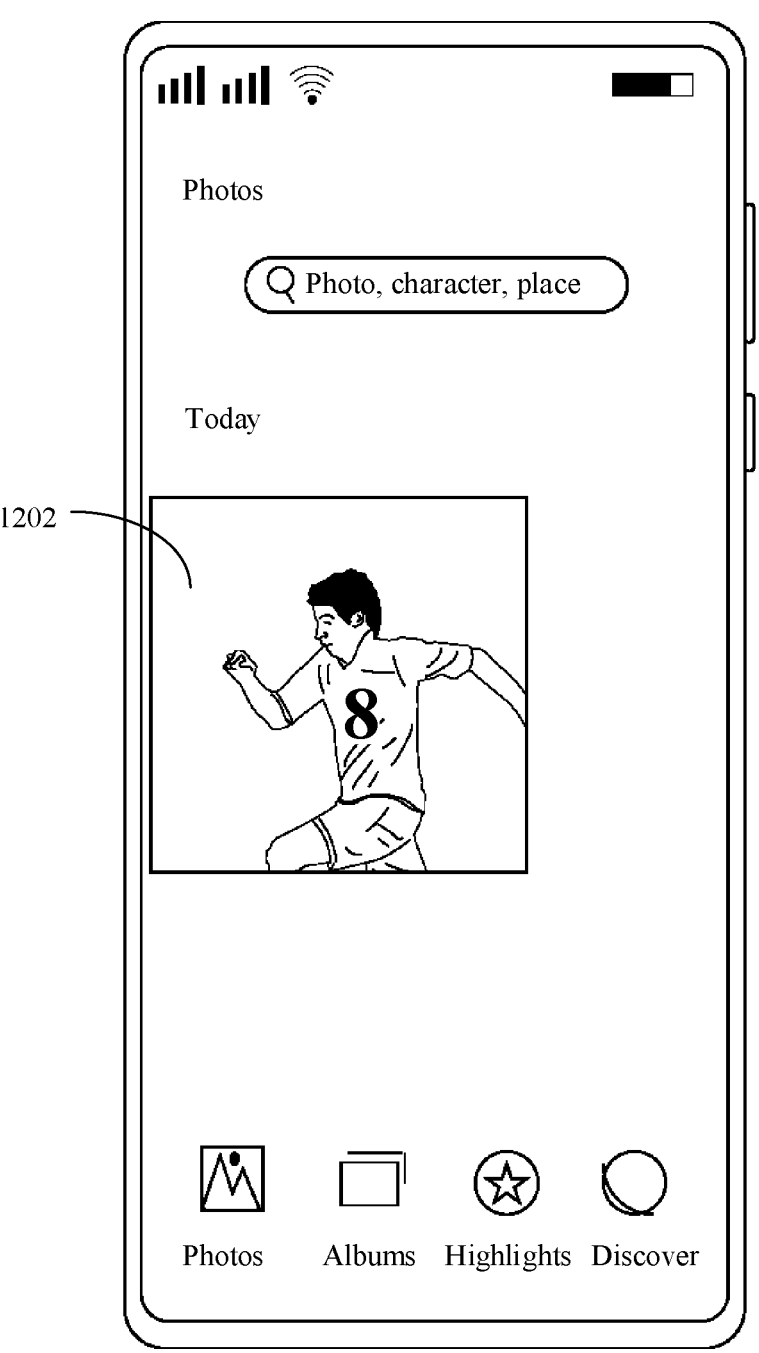

For example, a picture in a football match process is displayed in a video shooting interface shown in FIG. 13(A). As shown in FIG. 13(A), a user may tap a photo key 1201 to perform a manual capture operation. In response to the manual capture operation of the user, the mobile phone invokes a camera to perform photographing, and saves, in a gallery, an image obtained through photographing. For example, a thumbnail of an image 1202 manually captured by the mobile phone in a process of shooting a video is shown in a photo display interface that is of the gallery and that is shown in FIG. 13(B).

In a process in which the mobile phone shoots a video in the Magic Take mode, the user enables manual capture to shoot an image. It indicates that the image manually captured by the user is a highlight image considered by the user to be more memorable. Based on this, in response to the manual capture operation of the user, after saving the manually captured image in the gallery, the mobile phone may further save the manually captured image in a Magic Take folder as a highlight image.

In some embodiments, the mobile phone may save the manually captured image in the Magic Take folder for saving in place of a highlight image identified by the mobile phone.

It may be learned from the foregoing content of Embodiment 1 that, the mobile phone may score highlight degrees of images in a shot video by using an identification model, and determine a highlight image in the video by using highlight degree score values. The user captures images by using the manual capture function, and the mobile phone may discard, in ascending order of highlight degree score values, highlight images of a quantity of captured images. Then, the mobile phone saves a remaining highlight image and the manually captured images in the Magic Take folder as updated highlight images.

Figure 13C:
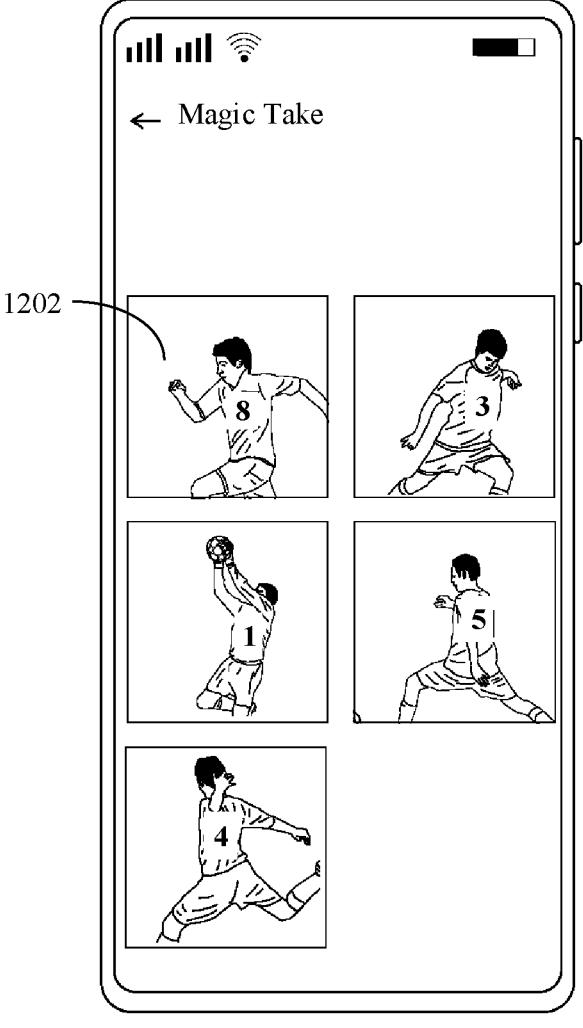

For example, the mobile phone is configured to save five highlight images in the Magic Take folder. In FIG. 13(A), the user enables the manual capture function to shoot one image. FIG. 13(C) shows the Magic Take folder, and the Magic Take folder includes thumbnails of four highlight images identified by the mobile phone from the shot video and the thumbnail of the image 1202 manually captured by the user.

The thumbnails of the highlight images in the Magic Take folder shown in FIG. 13(C) may be arranged in a shooting time sequence of the highlight images. That is, a thumbnail of an image is located in front of a thumbnail of an image shot by the mobile phone later than the image, and a thumbnail of an image is located behind a thumbnail of an image shot by the mobile phone earlier than the image. Certainly, this sorting manner does not constitute a limitation on an order of image thumbnails in the Magic Take folder.

Figure 13D:
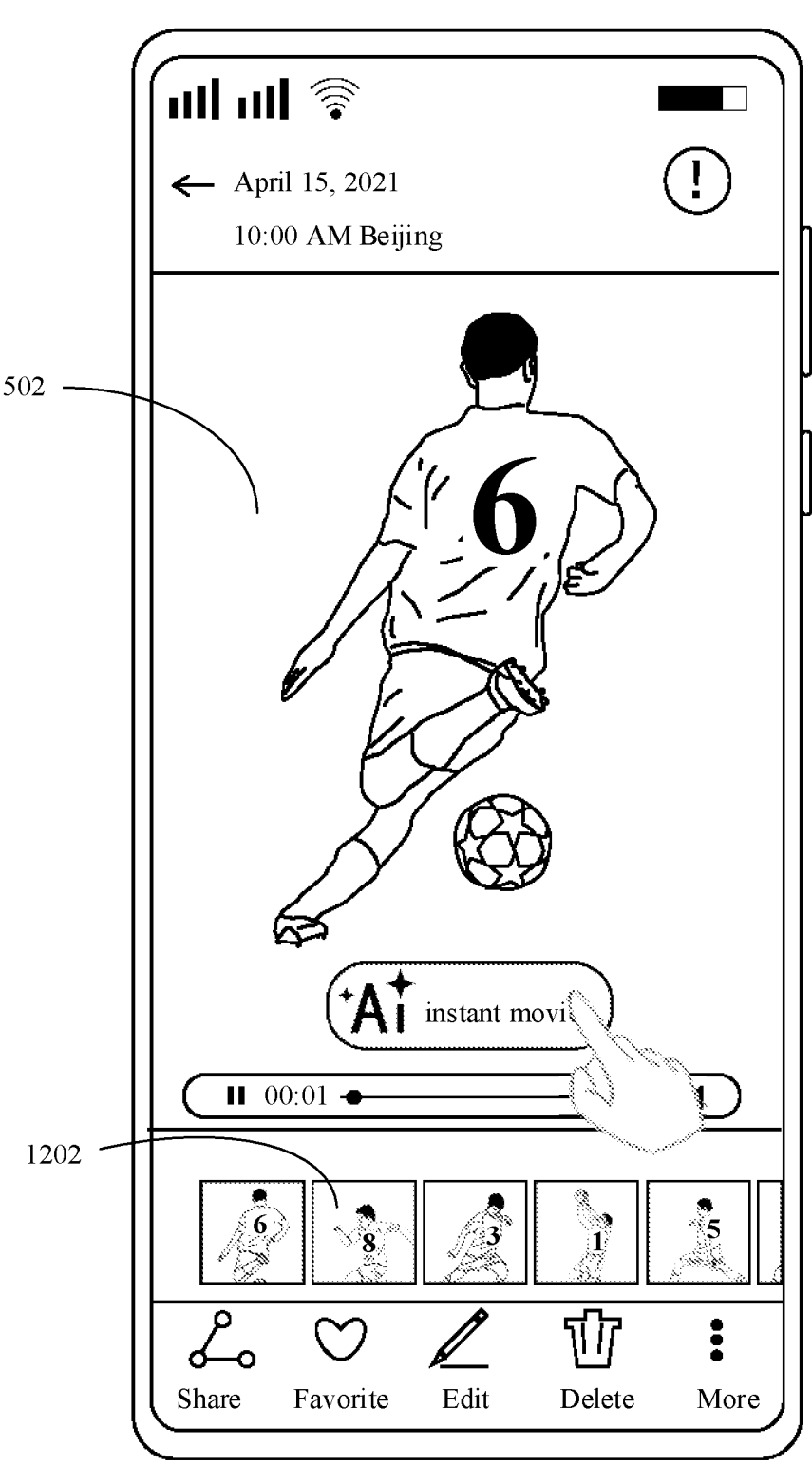

In addition, a detail interface of the video shot by the user is shown in FIG. 13(D). Thumbnails of highlight images in a video 502 are displayed in the detail interface, and are from the Magic Take folder displayed in FIG. 13(C). Therefore, the thumbnails of the highlight images in the video 502 include a cover thumbnail of the video 502, thumbnails of four highlight images identified by the mobile phone from the video 502, and the thumbnail of the image 1202 manually captured by the user.

It should be further noted that the user shoots an image by using the manual capture function, and after the mobile phone obtains an image through shooting, the mobile phone may further set a TAG for the image to indicate a position of the image in the shot video. The mobile phone may further write the TAG of the manually captured image into a configuration file of the video. In some embodiments, a TAG of a highlight image that is recorded in the configuration file of the video and that is discarded by the mobile phone is deleted while the TAG of the image manually captured by the mobile phone is saved in the configuration file of the video.

The user taps an "Ai instant movie" control in a detail interface that is of the video 502 and that is shown in FIG. 13(D), and the mobile phone generates a selected video of the video 502 in response to the tap operation of the user.

The configuration file of the video stores TAGs of the selected images identified by the mobile phone and the TAG of the manually captured image. Therefore, a selected video that is of the video 502 and that is generated by using the foregoing method for generating a selected video according to Embodiment 1 includes the image manually captured by the user and highlight images that are identified by the mobile phone and that are saved in the Magic Take folder.

Figure 13E:
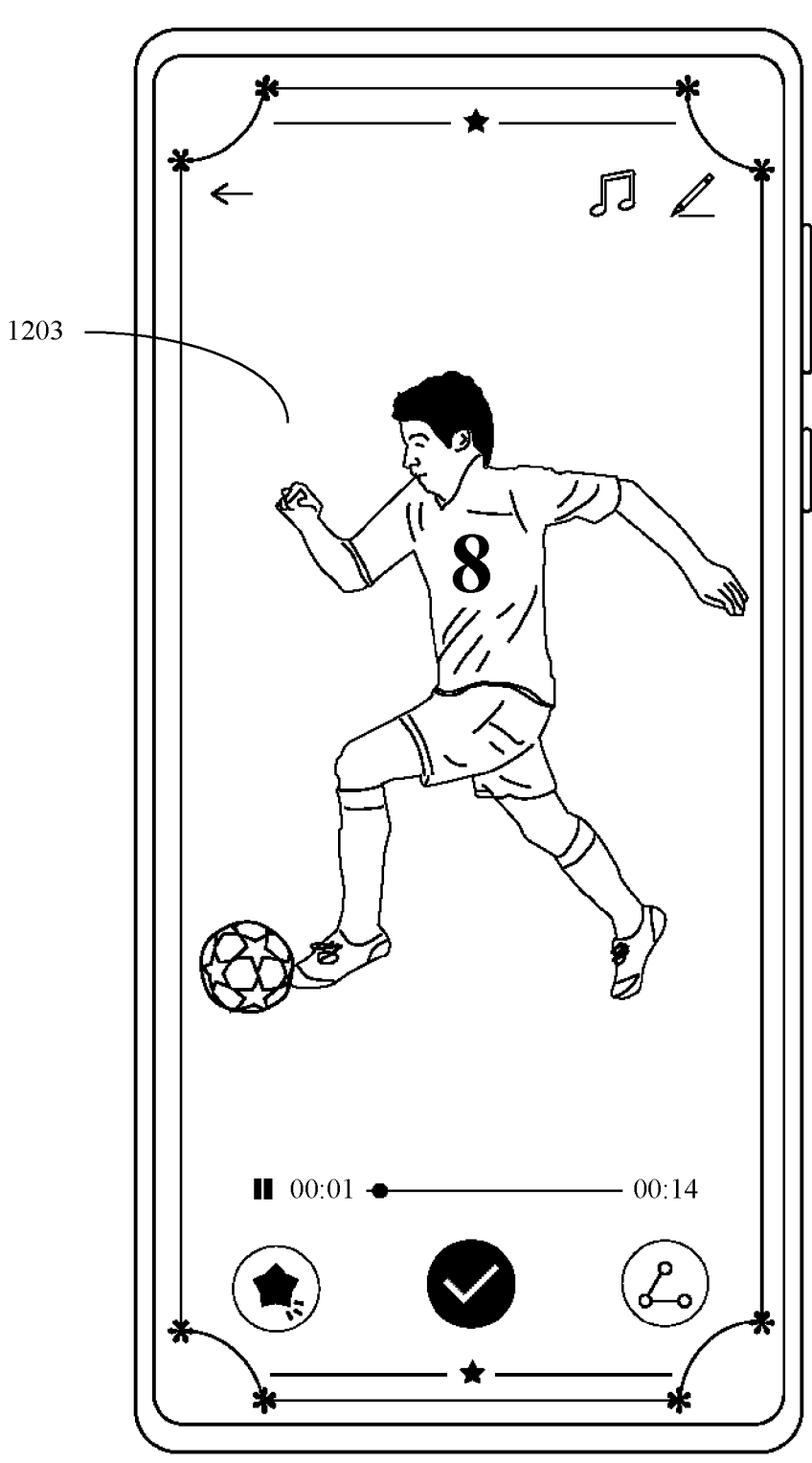

For example, FIG. 13(E) shows a display interface of a selected video 1203 of the video 502, the selected image 1203 is automatically played, and a currently displayed picture is the image manually captured by the user.

In some other embodiments, the mobile phone may save the manually captured image in the Magic Take folder as a new highlight image together with the highlight images identified by the mobile phone.

Figure 14A:
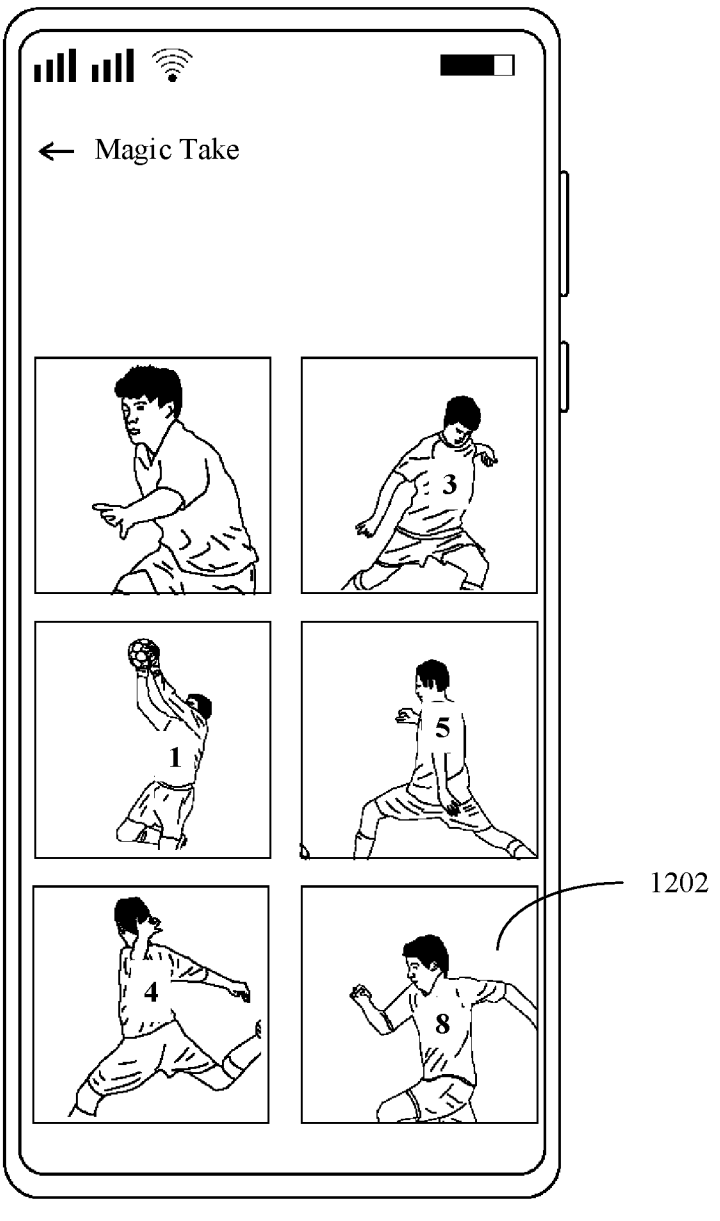
FIG. 14(A) and FIG. 14(B) are schematic diagrams of another example of a graphical user interface of "Magic Take" according to Embodiment 3 of this application.

For example, the mobile phone is configured to save five highlight images in the Magic Take folder. In FIG. 13(A), the user enables the manual capture function to shoot one image. FIG. 14(A) shows the Magic Take folder, and the Magic Take folder includes thumbnails of five highlight images identified by the mobile phone from the shot video and the thumbnail of the image 1202 manually captured by the user.

The thumbnails of the highlight images in the Magic Take folder shown in FIG. 14(A) may be arranged in a shooting time sequence of the highlight images, and the thumbnail of the image manually captured by the user is located in the last position. Certainly, this sorting manner does not constitute a limitation on an order of image thumbnails in the Magic Take folder.

Figure 14B:
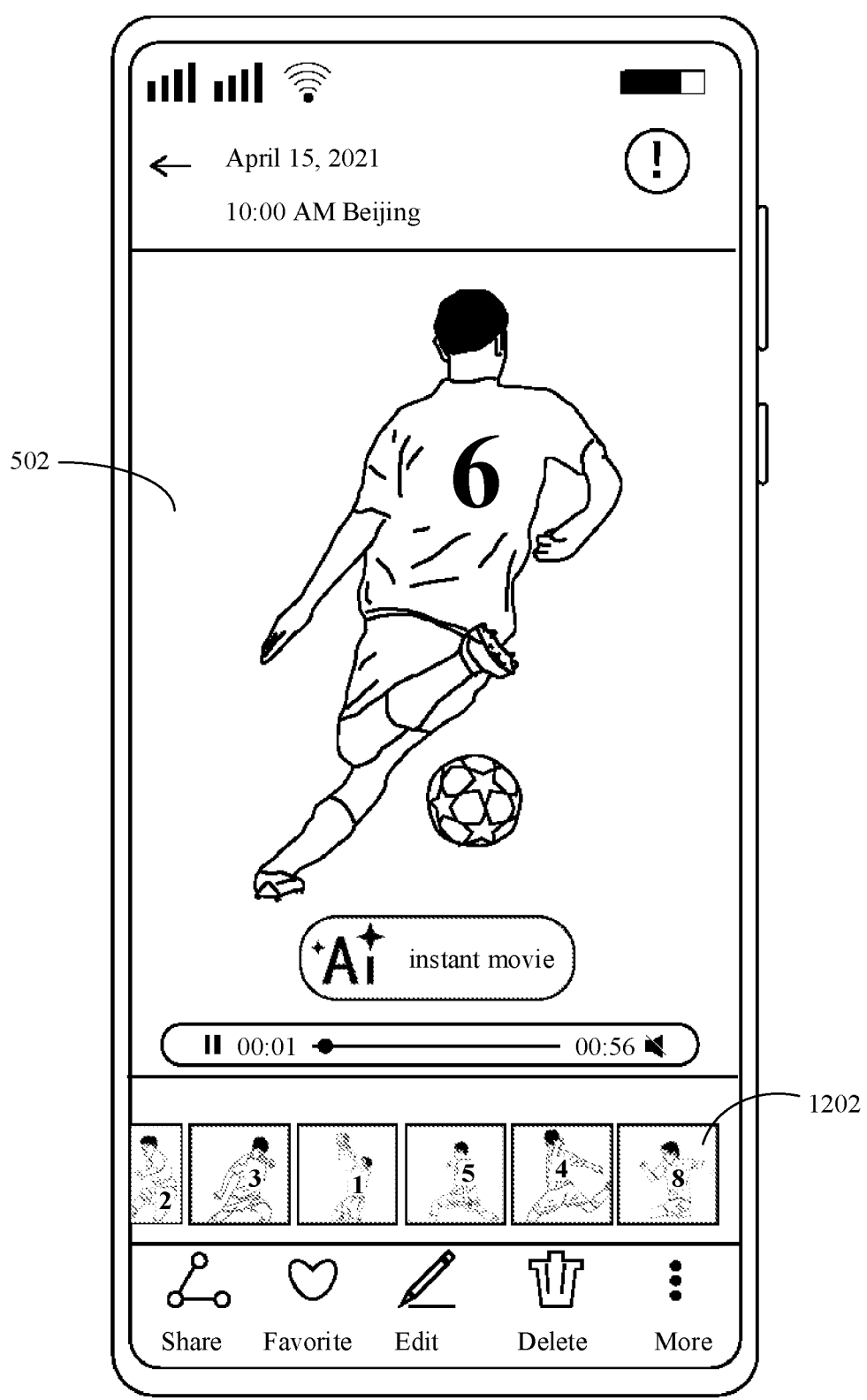

In addition, a detail interface of the video shot by the user is shown in FIG. 14(B). Thumbnails of highlight images in a video 502 are displayed in the detail interface, and are from the Magic Take folder displayed in FIG. 14(A). Therefore, the thumbnails of the highlight images in the video 502 include a cover thumbnail of the video 502, thumbnails of five highlight images identified by the mobile phone from the video 502, and the thumbnail of the image 1202 manually captured by the user.

It should be further noted that the user shoots an image by using the manual capture function, and after the mobile phone obtains an image through shooting, the mobile phone may further set a TAG for the image to indicate a position of the image in the shot video. The mobile phone may further write the TAG of the manually captured image into a configuration file of the video.

The user taps an "Ai instant movie" control in a detail interface that is of the video 502 and that is shown in FIG. 14(B), and the mobile phone generates a selected video of the video 502 in response to the tap operation of the user. The configuration file of the video stores TAGs of the selected images identified by the mobile phone and the TAG of the manually captured image. Therefore, a selected video that is of the video 502 and that is generated by using the foregoing method for generating a selected video according to Embodiment 1 includes the image manually captured by the user and highlight images that are identified by the mobile phone and that are saved in the Magic Take folder.

It should be further noted that, if the mobile phone cannot identify a highlight image from a shot video, but can identify an image of good quality, the mobile phone may generate a selected video by using an image manually captured by the user and the image of good quality. Certainly, for a generation manner of the selected video, refer to the foregoing method for generating a selected video according to Embodiment 1. This is not described herein.

Another embodiment of this application further provides a computer-readable storage medium. The computer-readable storage medium stores instructions. When the instructions are run on a computer or a processor, the computer or the processor is enabled to perform one or more steps in any one of the foregoing methods.

The computer-readable storage medium may be a non-temporary computer-readable storage medium. For example, the non-temporary computer-readable storage medium may be a ROM, a random access memory (RAM), a CD-ROM, a magnetic tape, a floppy disk, or an optical data storage device.

Another embodiment of this application further provides a computer program product including instructions. When the computer program product runs on a computer or a processor, the computer or the processor is enabled to perform one or more steps in any one of the foregoing methods.

What is claimed is:

1. A video processing method, wherein the video processing method comprises:

shooting a first video in response to a first operation; and displaying a first interface in response to a second operation, wherein the first interface is a detail interface of the first video, and the first interface comprises a first region, a second region, and a first control, the first interface comprises the first region and the second region, or the first interface comprises the first region and the first control, wherein the first region is a playback region of the first video;

the second region displays a cover thumbnail of the first video, a thumbnail of a first image, and a thumbnail of a second image, the first image is an image of the first video at a first moment, the second image is an image of the first video at a second moment, and a recording process of the first video comprises the first moment and the second moment; and the first control is used to control an electronic device to generate a second video, duration of the second video is less than duration of the first video, and the second video comprises at least images of the first video, and wherein a generation manner of the second video comprises:

obtaining the first video and tag data of the first video, wherein the tag data comprises a theme tag of the first video, a storyboard tag, a tag of the first image, and a tag of the second image;

determining a style template and music based on the theme tag of the first video, wherein the style template comprises at least one special effect;

obtaining a plurality of previous and following frames of images of the first image and a plurality of previous and following frames of images of the second image from the first video based on the storyboard tag, the tag of the first image, and the tag of the second image; and combining the special effect of the style template, the music, and target images to obtain the second video, wherein the target images comprise at least the first image and the plurality of previous and following frames of images of the first image.

2. The video processing method according to claim 1, further comprising:

displaying a second interface in response to a third operation, wherein the third operation is a touch operation on the first control, and the second interface is a display interface of the second video.

3. The video processing method according to claim 2, after the displaying a second interface in response to a third operation, further comprising:

displaying a seventh interface in response to a ninth operation, wherein the seventh interface is a detail interface of the second video, the ninth operation is a touch operation on a third control comprised in the second interface, and the third control is used to control saving of the second video; and displaying an eighth interface in response to a tenth operation, wherein the eighth interface is an interface of a gallery application, and the eighth interface comprises a cover thumbnail of the second video and the cover thumbnail of the first video.

4. The video processing method according to claim 1, wherein the displaying a first interface in response to a second operation comprises:

displaying a third interface in response to a fourth operation, wherein the third interface is an interface of a gallery application, and the third interface comprises the cover thumbnail of the first video; and displaying the first interface in response to a touch operation on the cover thumbnail of the first video.

5. The video processing method according to claim 4, wherein the cover thumbnail of the first video comprises a first identifier, and the first identifier is used to indicate that the first video is shot by the electronic device in a Magic Take mode.

6. The video processing method according to claim 1, wherein the displaying a first interface in response to a second operation comprises:

displaying the first interface in response to a touch operation on a second control, wherein a shooting interface of the electronic device comprises the second control, and the second control is used to control display of a previously shot image or video.

7. The video processing method according to claim 1, after the shooting a first video in response to a first operation, further comprising:

displaying a fifth interface in response to a seventh operation, wherein the fifth interface is an interface of a gallery application, the fifth interface comprises a first folder and a second folder, the first folder comprises images and the first video that are saved by the electronic device, and the second folder comprises the first image and the second image; and displaying a sixth interface in response to an eighth operation, wherein the sixth interface comprises the thumbnail of the first image and the thumbnail of the second image, and the eighth operation is a touch operation on the second folder.

8. The video processing method according to claim 1, after the shooting a first video in response to a first operation, further comprising:

displaying a first shooting interface of the electronic device in response to an eleventh operation, wherein the first shooting interface comprises a first option and a second option, the first option is used to indicate a photo mode, and the second option is used to indicate a video mode;

displaying the first shooting interface of the electronic device in response to an operation on a fourth control in the shooting interface, wherein the fourth control is used to enable photographing; and displaying a second shooting interface of the electronic device in response to an operation on the second option, wherein the second shooting interface comprises a third dialog box, and the third dialog box is used to indicate a content of a Magic Take function.

9. The video processing method according to claim 1, in a process of shooting the first video in response to the first operation, further comprising:

shooting and saving a third image in response to a twelfth operation, wherein the twelfth operation is a touch operation on a photo key of a video shooting interface of the electronic device.

10. The video processing method according to claim 9, wherein the second region further displays a thumbnail of the third image, and the second video comprises the third image.

11. The video processing method according to claim 9, wherein that the second region displays a cover thumbnail of the first video, a thumbnail of a first image, and a thumbnail of a second image comprises:

the second region displays the cover thumbnail of the first video, the thumbnail of the first image, and the thumbnail of the third image; and the second video comprises at least the first image and the third image.

12. A video processing method, wherein the video processing method comprises:

in response to a first operation, displaying a first interface, and starting shooting a first video, wherein the first interface is a preview interface displayed when the first video is shot, the first interface comprises a first control, and the first control is used to shoot an image;

in response to a second operation, shooting and saving a first image in a process of shooting the first video, wherein the second operation is a touch operation on the first control; and after completing shooting of the first video, displaying a second interface in response to a third operation, wherein the second interface is a detail interface of the first video, and the second interface comprises a first region, a second region, and the first control, the second interface comprises the first region and the second region, or the second interface comprises the first region and the first control, wherein the first region is a playback region of the first video, the second region displays a cover thumbnail of the first video and a thumbnail of the first image, the first control is used to control an electronic device to generate a second video, duration of the second video is less than duration of the first video, and the second video comprises at least images of the first video, and wherein a generation manner of the second video comprises:

obtaining the first video and tag data of the first video, wherein the tag data comprises a theme tag of the first video and a storyboard tag;

determining a style template and music based on the theme tag of the first video, wherein the style template comprises at least one special effect;

determining a storyboard clip in each scene in the first video based on the storyboard tag;

obtaining a plurality of target images based on the storyboard clips; and combining the special effect of the style template, the music, and target images to obtain the second video.

13. The video processing method according to claim 12, wherein the second region further displays thumbnails of one or more other frames of images, the one or more other frames of images are images in the first video, a quantity sum of the first image and the one or more other frames of images is greater than or equal to a preset quantity, and the preset quantity is a quantity of second images automatically identified by the electronic device in the process of shooting the first video.

14. The video processing method according to claim 13, wherein the second video comprises at least one or more frames of the following images: the first image and the one or more other frames of images.

15. The video processing method according to claim 12, further comprising:

displaying a third interface in response to a fourth operation, wherein the fourth operation is a touch operation on the first control, and the third interface is a display interface of the second video.

16. The video processing method according to claim 12, wherein after shooting of the first video is completed, the method further comprises:

displaying a first shooting interface of the electronic device, wherein the shooting interface comprises a first option and a second option, the first option is used to indicate a photo mode, the second option is used to indicate a video mode, and the first shooting interface is a preview interface displayed when an image is shot;

displaying the first shooting interface of the electronic device in response to an operation on a second control in the shooting interface, wherein the second control is used to enable photographing; and displaying a second shooting interface of the electronic device in response to an operation on the second option, wherein the second shooting interface comprises a first dialog box, the first dialog box is used to indicate content of a Magic Take function, and the second shooting interface is a preview interface displayed when a video is shot.

17. The video processing method according to claim 12, after shooting of the first video is completed, further comprising:

displaying a third interface in response to a sixth operation, wherein the third interface is an interface of a gallery application, the third interface comprises a first folder and a second folder, the first folder comprises at least the first image, and the second folder comprises a second image and a third image, or the second folder comprises the second image; and displaying a fourth interface in response to a seventh operation, wherein the fourth interface comprises a thumbnail of the second image and a thumbnail of the third image, or comprises the thumbnail of the second image, and the seventh operation is a touch operation on the second folder.

18. An electronic device, comprising:

one or more processors, a memory, a camera, and a display screen, wherein the memory, the camera, and the display screen are coupled to the one or more processors, the memory is configured to store computer program code, the computer program code comprises computer instructions, and when the one or more processors execute the computer instructions, the electronic device performs:

in response to a first operation, displaying a first interface, and starting shooting a first video, wherein the first interface is a preview interface displayed when the first video is shot, the first interface comprises a first control, and the first control is used to shoot an image;

in response to a second operation, shooting and saving a first image in a process of shooting the first video, wherein the second operation is a touch operation on the first control; and after completing shooting of the first video, displaying a second interface in response to a third operation, wherein the second interface is a detail interface of the first video, and the second interface comprises a first region, a second region, and the first control, the second interface comprises the first region and the second region, or the second interface comprises the first region and the first control, wherein the first region is a playback region of the first video, the second region displays a cover thumbnail of the first video and a thumbnail of the first image, the first control is used to control the electronic device to generate a second video, duration of the second video is less than duration of the first video, and the second video comprises at least images of the first video, and wherein a generation manner of the second video comprises:

obtaining the first video and tag data of the first video, wherein the tag data comprises a theme tag of the first video and a storyboard tag;

determining a style template and music based on the theme tag of the first video, wherein the style template comprises at least one special effect;

determining a storyboard clip in each scene in the first video based on the storyboard tag;

obtaining a plurality of target images based on the storyboard clips; and combining the special effect of the style template, the music, and target images to obtain the second video.

19. The electronic device according to claim 18, wherein the second region further displays thumbnails of one or more other frames of images, the one or more other frames of images are images in the first video, a quantity sum of the first image and the one or more other frames of images is greater than or equal to a preset quantity, and the preset quantity is a quantity of second images automatically identified by the electronic device in the process of shooting the first video.

20. The electronic device according to claim 19, wherein the second video comprises at least one or more frames of the following images: the first image and the one or more other frames of images.

\* \* \* \* \*